United States Patent [19]
Taylor

[11] 3,936,876
[45] Feb. 3, 1976

[54] ROTATABLE DATA STORAGE APPARATUS WITH TRACK SELECTION ACTUATOR HAVING MULTIPLE VELOCITIES

[75] Inventor: John R. Taylor, Eastleigh, England

[73] Assignee: International Business Machines Corporation, Armonk, N.Y.

[22] Filed: Jan. 21, 1974

[21] Appl. No.: 435,140

[30] Foreign Application Priority Data
Jan. 31, 1973 United Kingdom............... 4865/73

[52] U.S. Cl.................................. 360/78; 360/106
[51] Int. Cl.²................. G11B 21/08; G11B 5/55
[58] Field of Search .......... 360/75, 77, 78, 98, 105, 360/106

[56] References Cited
UNITED STATES PATENTS

| | | | |
|---|---|---|---|
| 3,122,687 | 2/1964 | Romvari | 360/77 |
| 3,209,338 | 9/1965 | Romvari | 360/78 |
| 3,399,391 | 8/1968 | Barrosse | 360/77 |
| 3,691,543 | 9/1972 | Mueller | 360/77 |
| 3,696,354 | 10/1972 | Palumbo et al. | 360/78 |
| 3,699,555 | 10/1972 | Duvall | 360/78 |
| 3,789,378 | 1/1974 | Bonzano et al. | 360/77 |
| 3,821,804 | 6/1974 | Stevenson et al. | 360/77 |

Primary Examiner—Raymond F. Cardillo, Jr.
Attorney, Agent, or Firm—Keith T. Bleuer

[57] ABSTRACT

The invention relates to rotatable data storage apparatus of the type in which relative movement between a data transducer and a data storage medium is utilized to record data on and to read data from one or more parallel data tracks on the medium.

7 Claims, 53 Drawing Figures

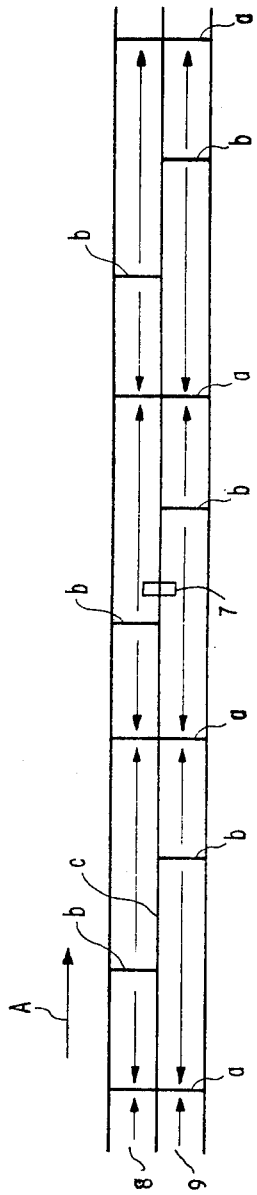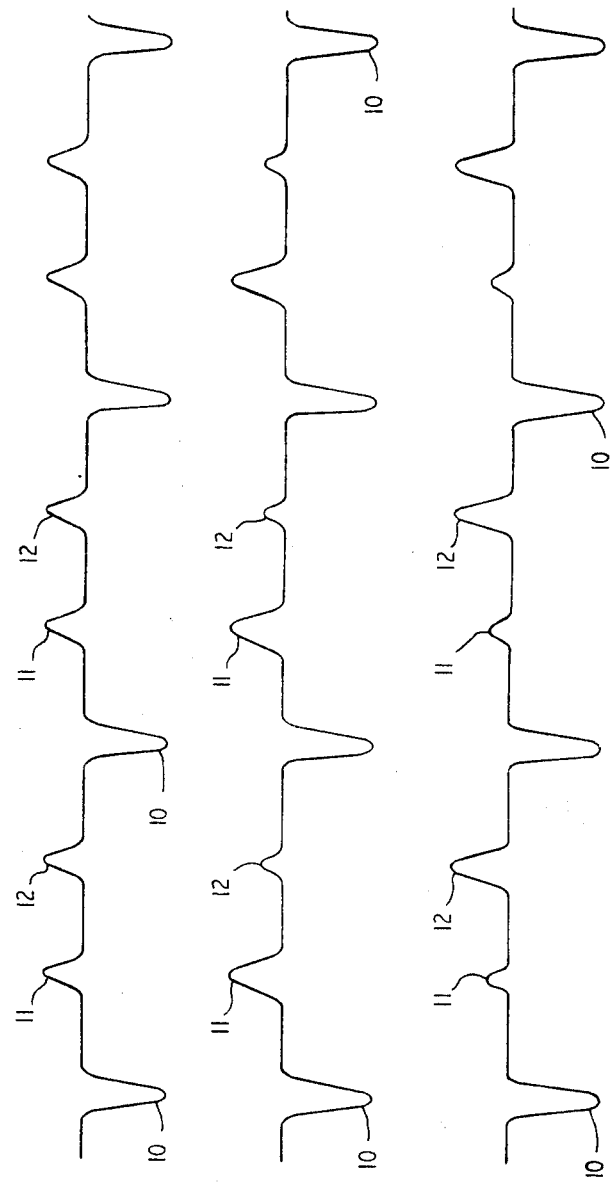
FIG. 2
FIG. 3a
FIG. 3b
FIG. 3c

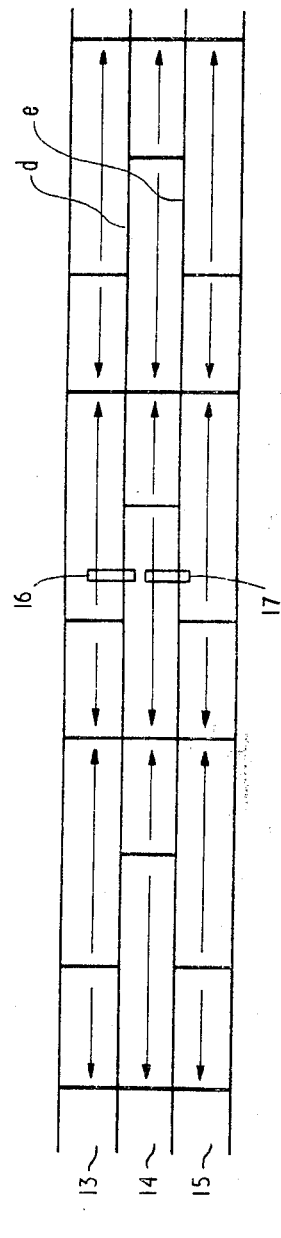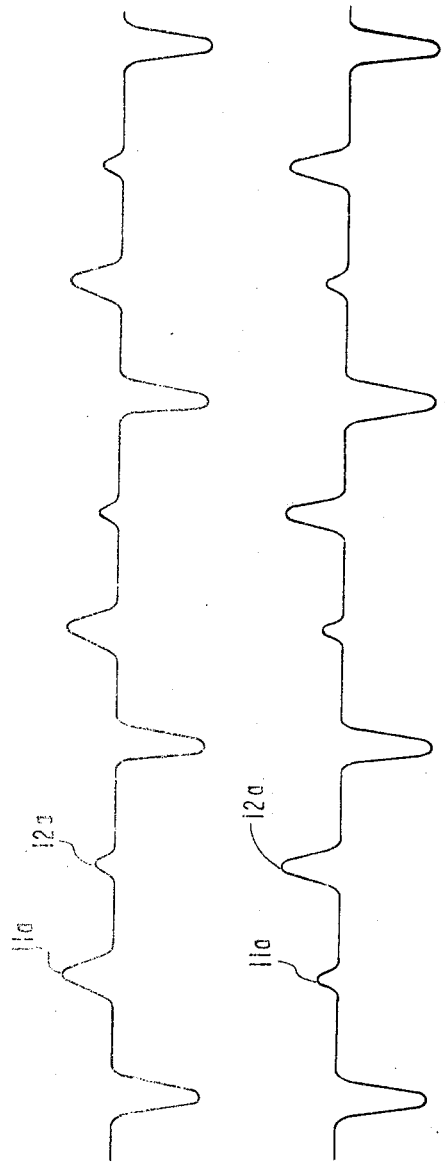
FIG. 4
FIG. 5a
FIG. 5b

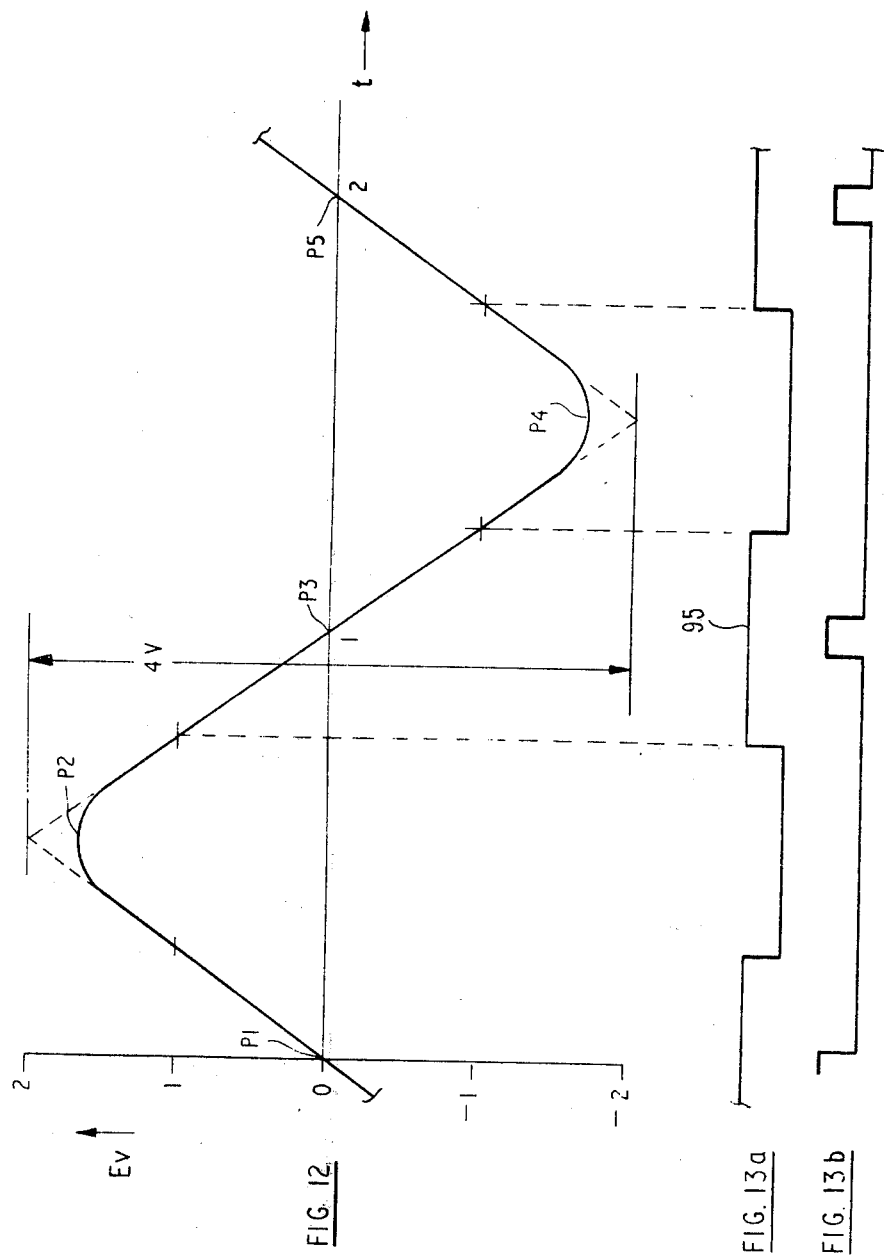

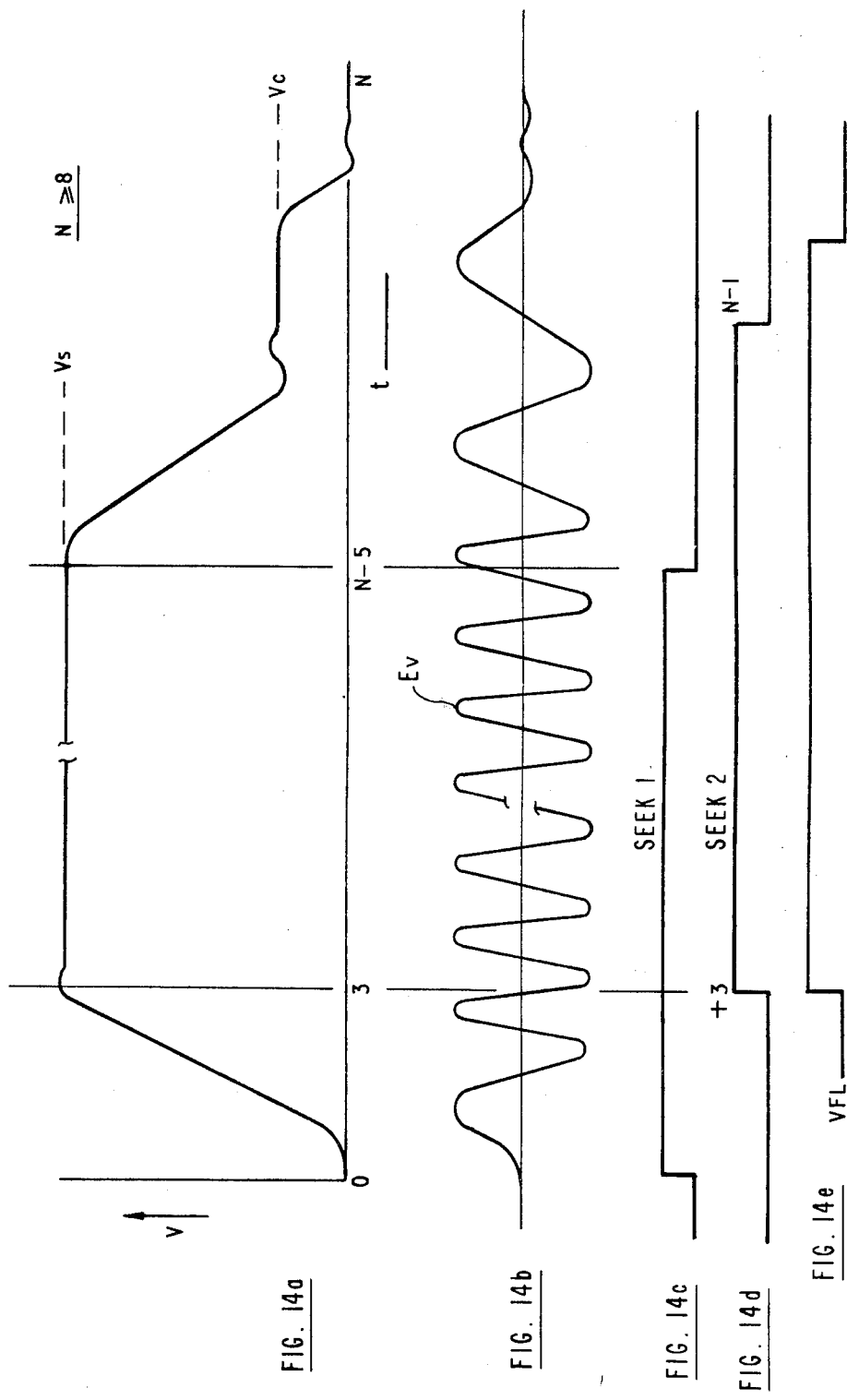

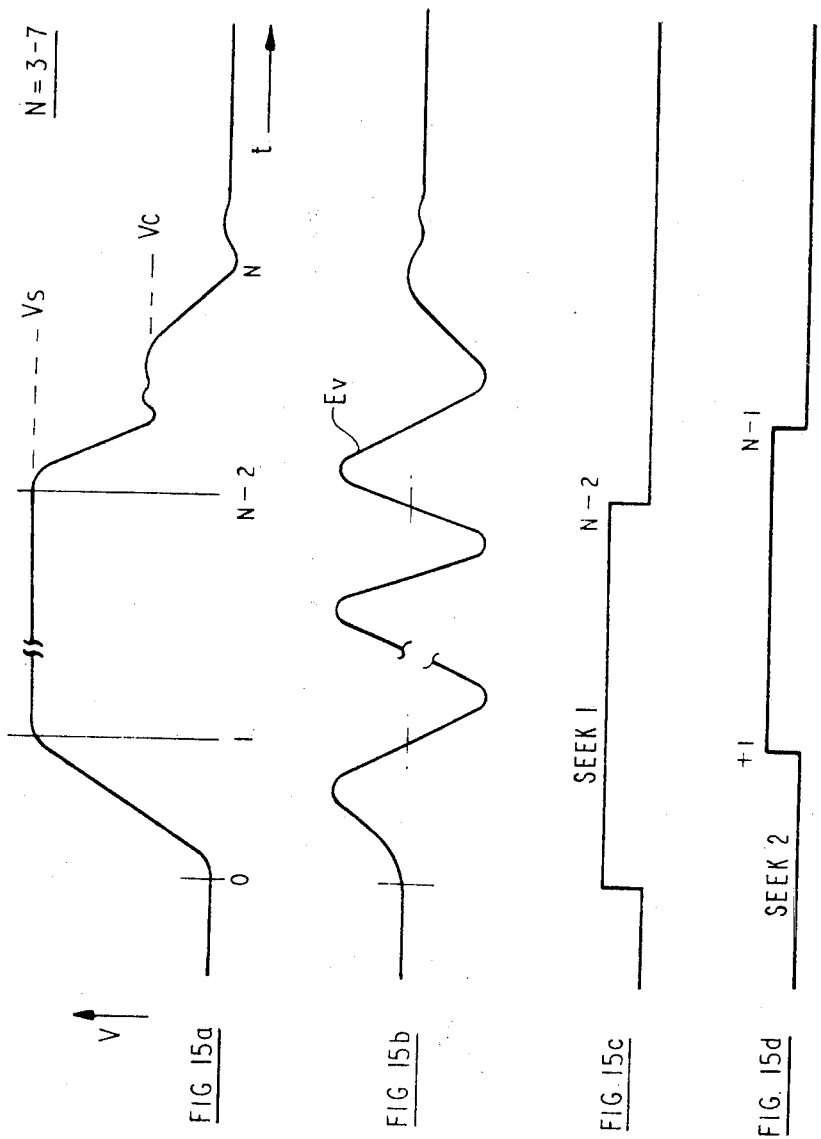

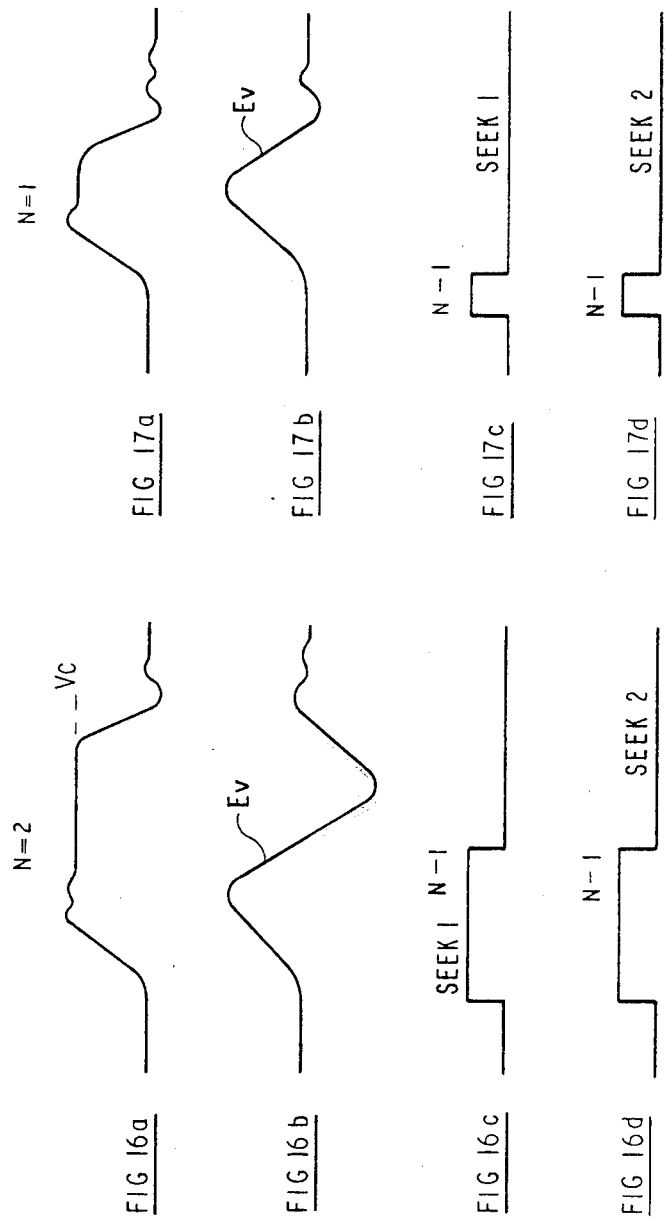

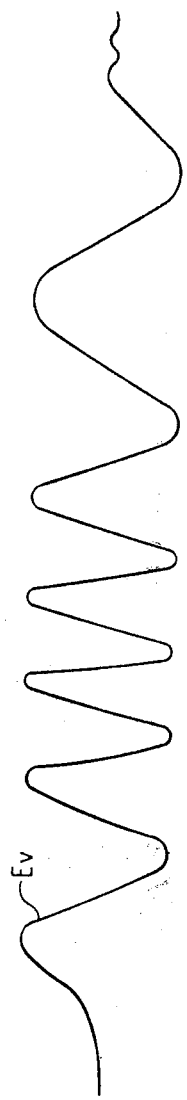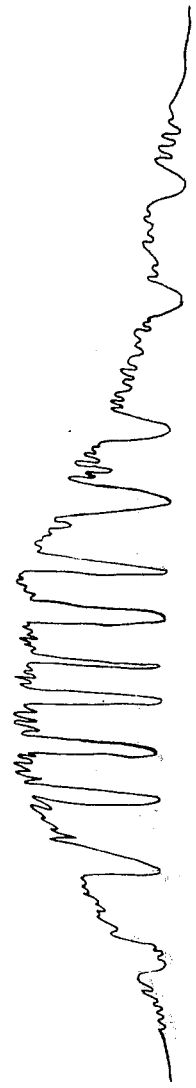
FIG. 18a
FIG. 18b

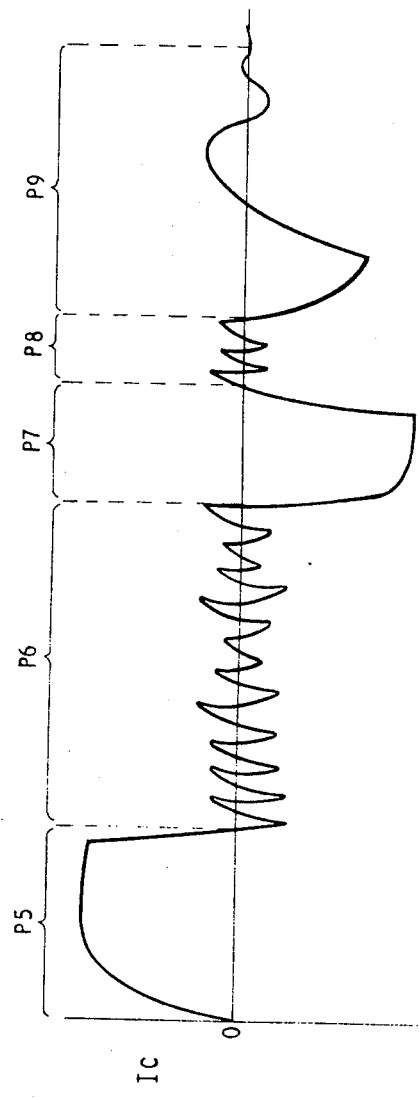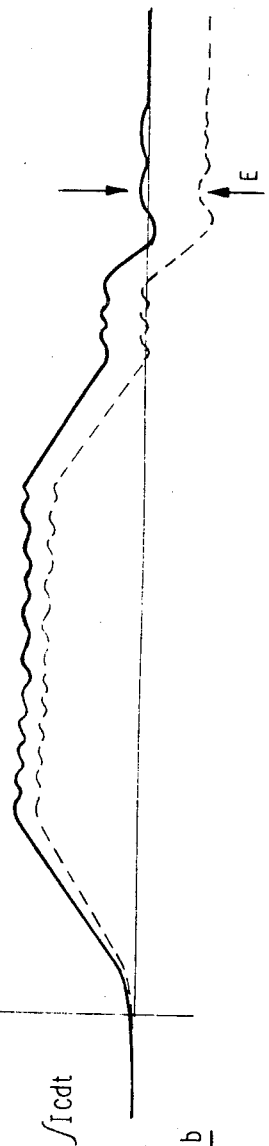
FIG 19a
FIG 19b

LEAD — LAG
COMPENSATOR
CHARACTERISTIC

FILTER

ROTATABLE DATA STORAGE APPARATUS WITH TRACK SELECTION ACTUATOR HAVING MULTIPLE VELOCITIES

The data storage apparatus, according to the invention, comprises a rotatable storage medium having a number of data tracks thereon, a data transducer movable by an actuator over the data tracks from one transducing position to another, and control means for supplying control signals to the actuator, the arrangement being such that when the transducer is moved from a first data track to a destination track more than one track away from the first data track, the control means supplies signals to the actuator to move it to accelerate the transducer over a first predetermined distance, to continue to move the transducer at a uniform velocity over a second predetermined distance, the uniform velocity being equal or substantially equal to the velocity attained by the transducer as a result of the acceleration, and to retard the transducer and locate it in a transducing position over the destination track for the remaining distance.

In order that the invention may be fully understood, a preferred embodiment will now be described with reference to the accompanying drawings.

In the drawings:

FIG. 1 shows schematically a data storage system incorporating the present invention, FIG. 2 shows how servo tracks are encoded to provide position information, FIGS. 3a, 3b and 3c show waveforms detected by a servo transducer when on-track, displaced from on-track position in one direction and displaced from the on-track position in the other direction, FIG. 4 shows three servo tracks defining odd and even guide paths, FIGS. 5a and 5b show waveforms detected by a pair of servo transducers when displaced in the same direction from odd and even guide paths, FIG. 6 shows a block form a circuit completing a servo position loop connecting a servo transducer with a voice coil actuator, FIG. 7 shows in block form a position detect circuit forming part of the servo position loop illustrated diagrammatically in FIG. 6, FIG. 8 shows the waveforms at various parts of the circuit shown in FIG. 7, FIG. 9 shows a block form a servo position compensator circuit forming a part of the FIG. 6 circuit completing the servo position loop, FIG. 10 shows a block form the driver circuit of the FIG. 6 circuit, FIG. 11 shows a block form a phase locked oscillator which provides clock pulses for the data channels of the data storage system, FIG. 12 shows a servo error signal constituting an output of the FIG. 7 circuit, during a track seek operation, FIGS. 13a and 13b show logic signals derived from the servo error signal of the FIG. 7 circuit, during a track seek operation, FIGS. 14a to 14e show a velocity profile, an error signal and control signals for a track access over eight or more tracks;

FIGS. 15a to 15d show similar waveforms for track access from three to seven;

FIGS. 16 to 16d show similar waveforms for track access of two tracks,

FIGS. 17a to 17d show similar waveforms for a single track access,

Figure 6:
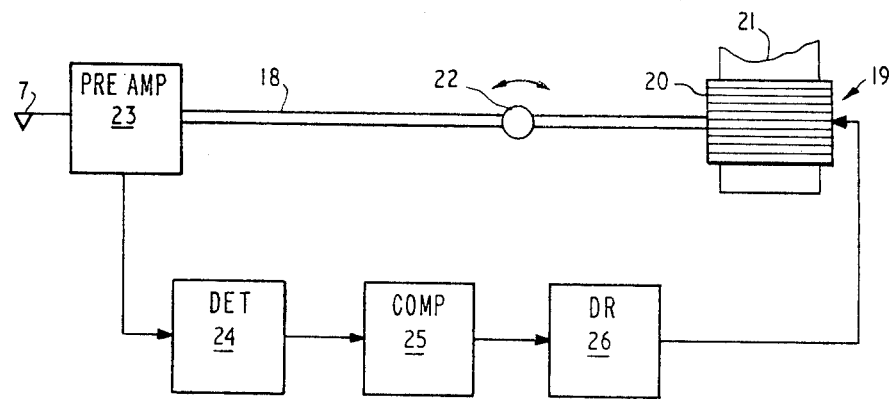
Figure 7:
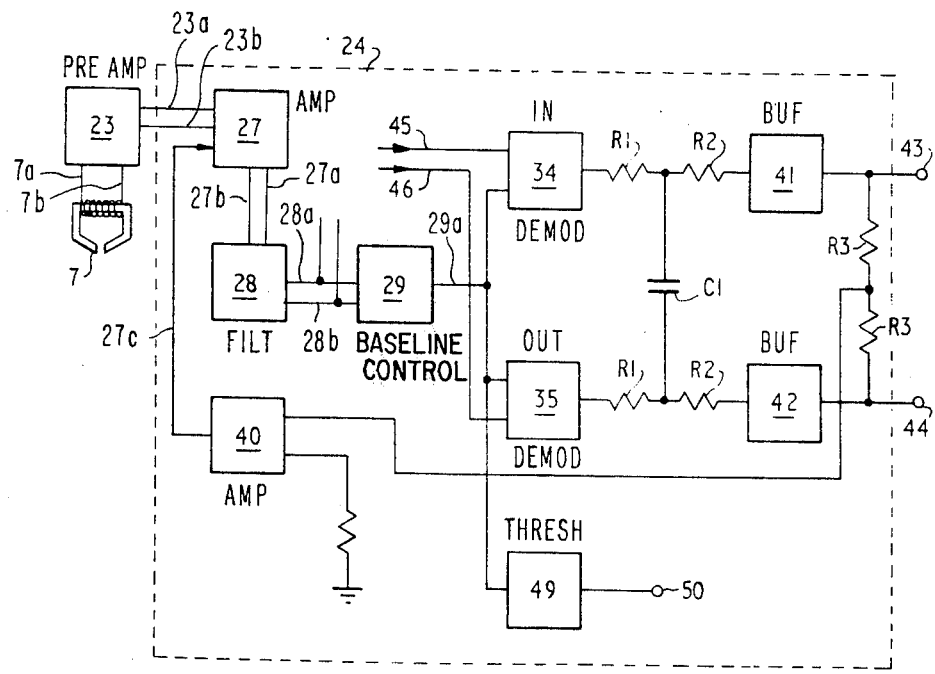
Figure 11:
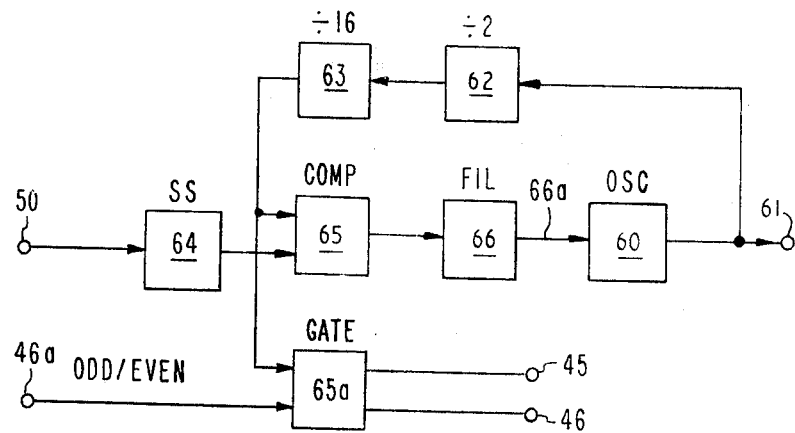
Figure 20:
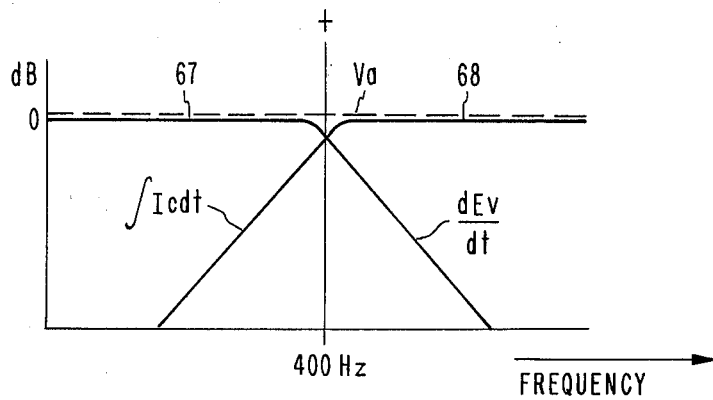
Figure 21:
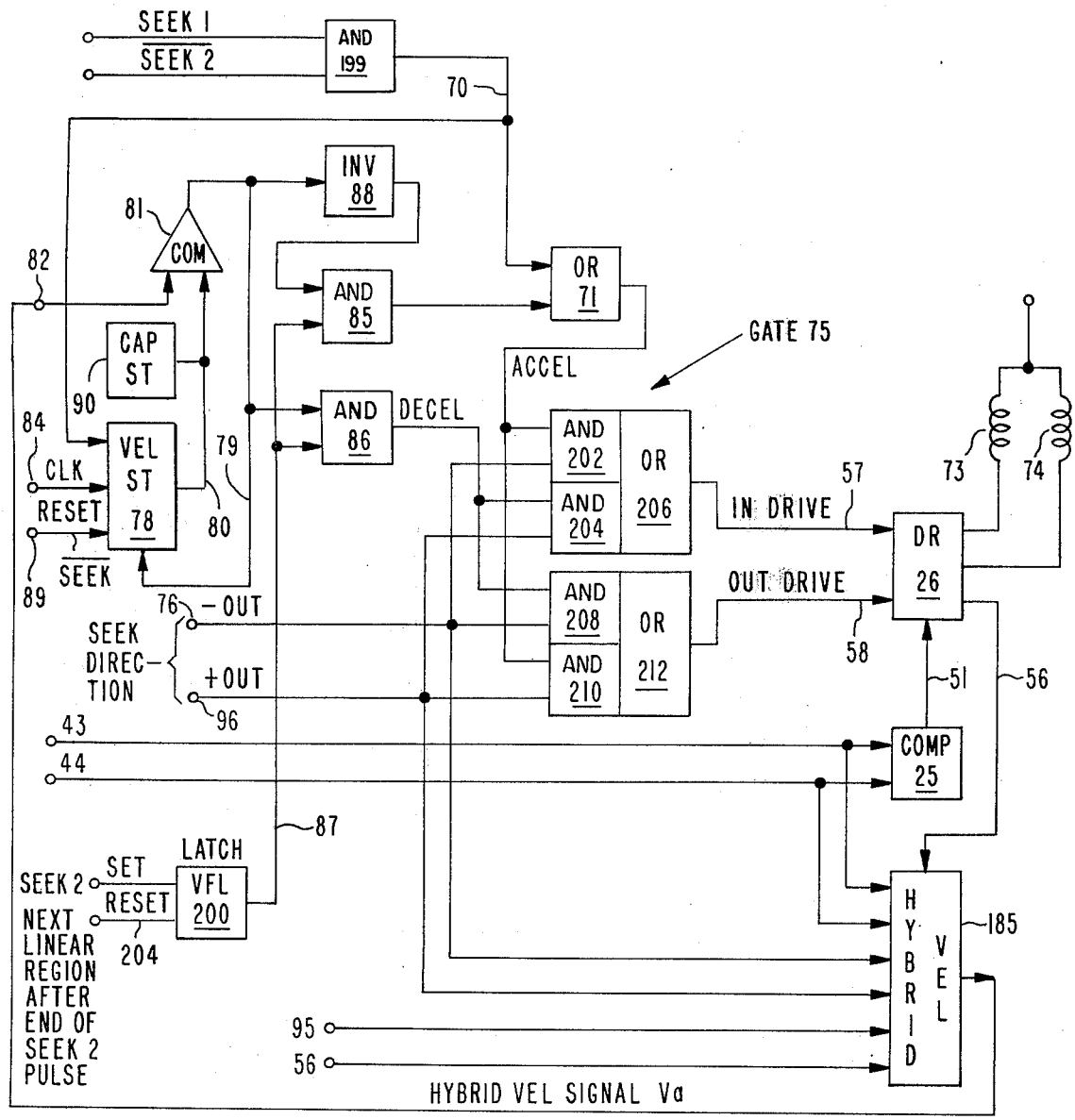
Figure 22:
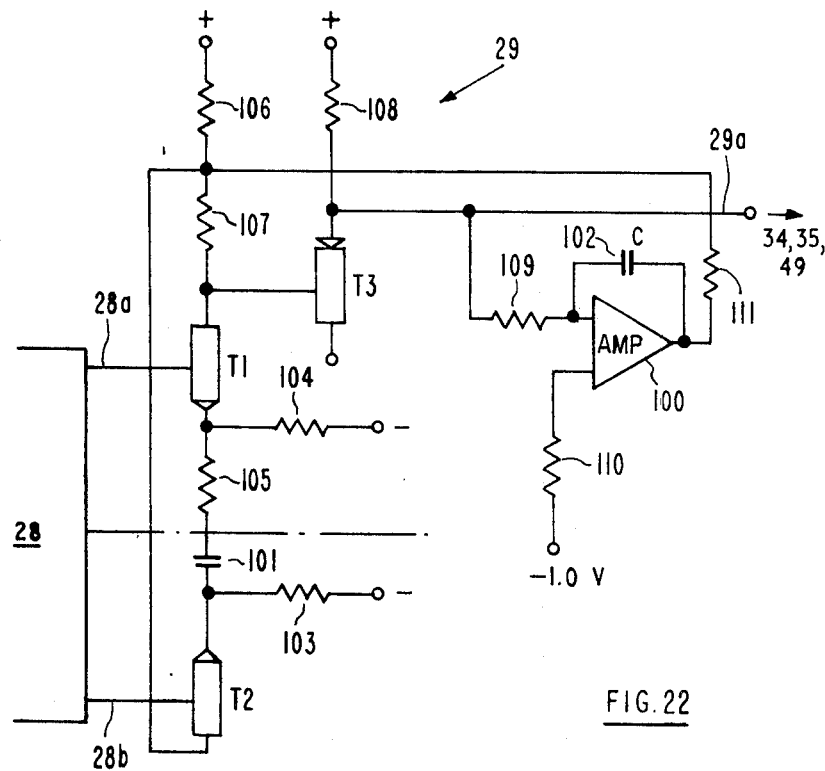
Figure 23:
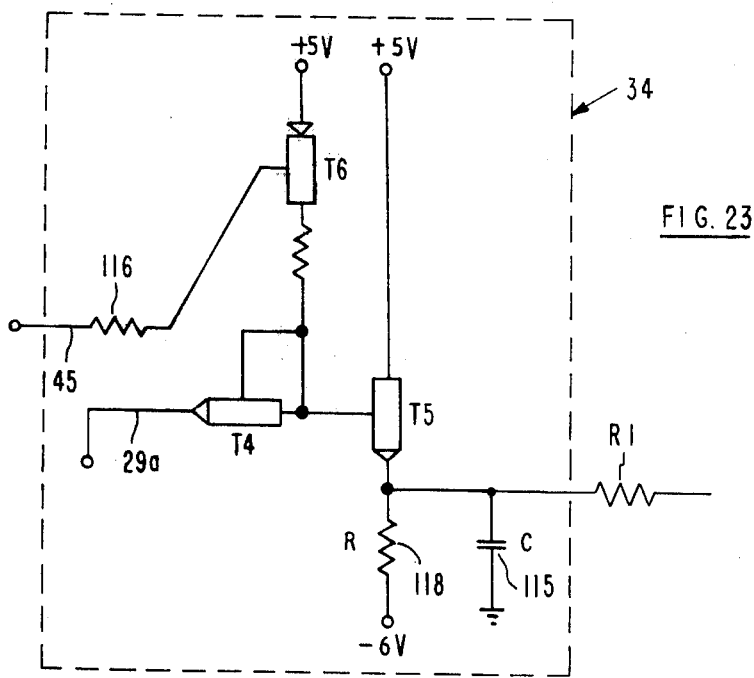
Figure 24:
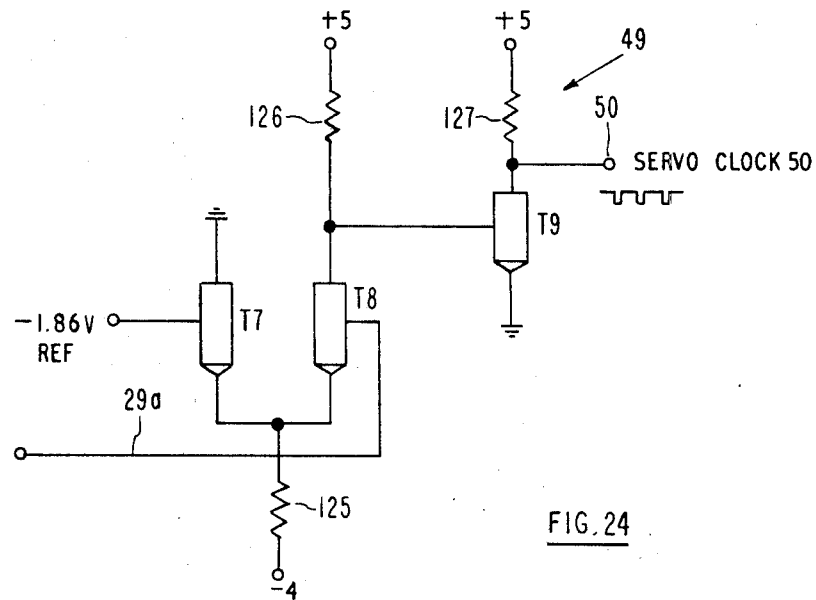
Figure 25:
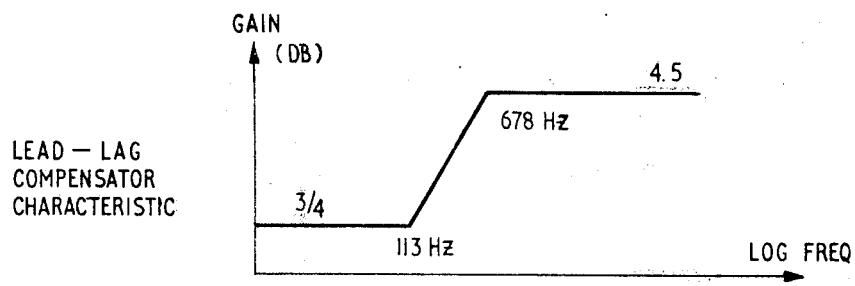
Figure 26:
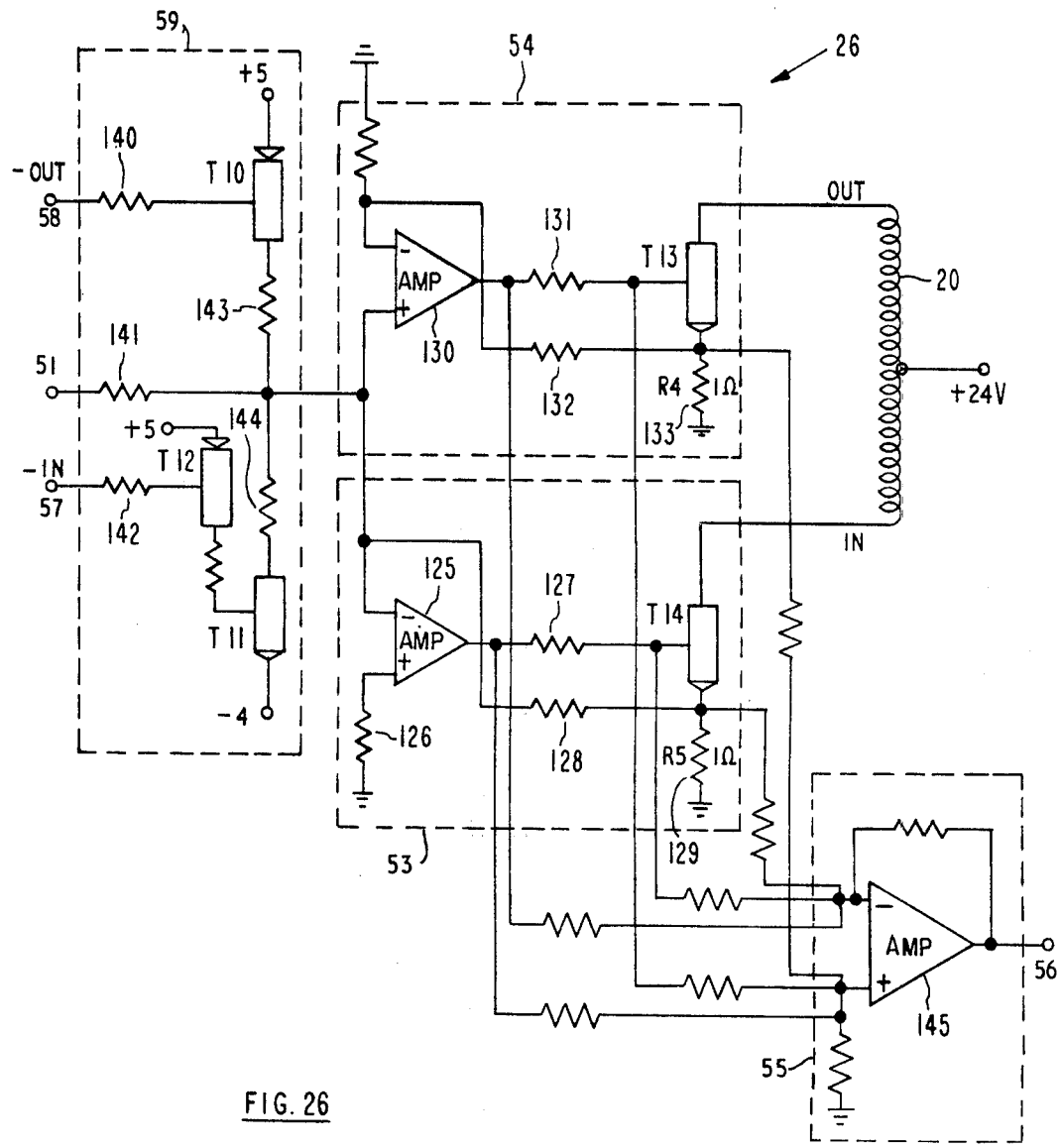
Figure 27A:
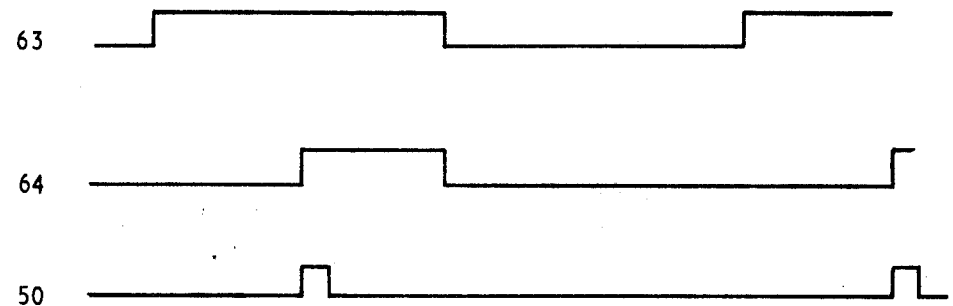
Figure 27B:
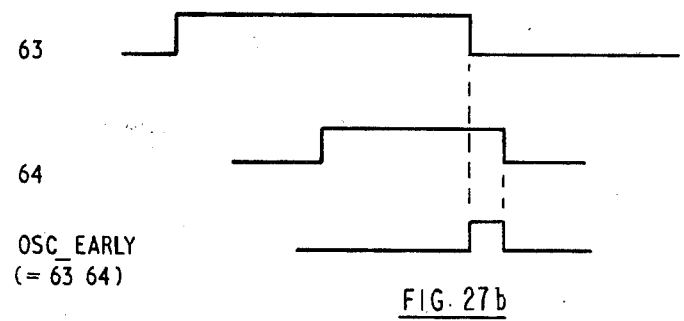
Figure 27C:
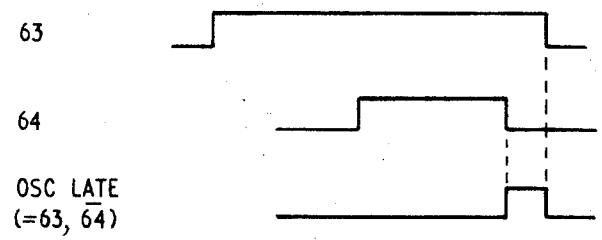
Figure 27D:
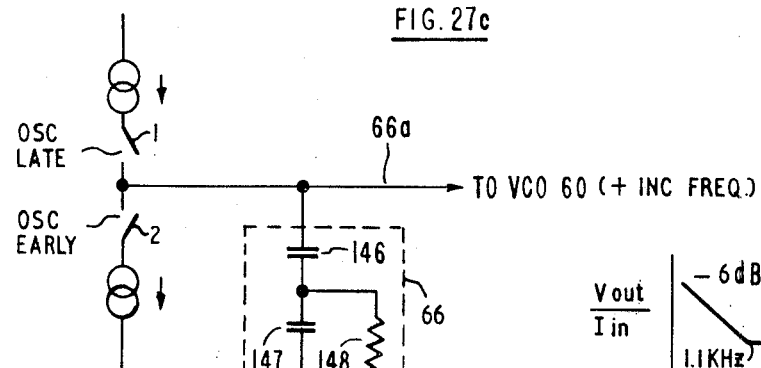
Figure 27E:
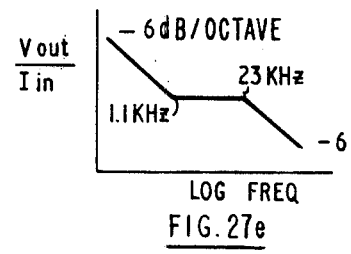
Figure 28A:
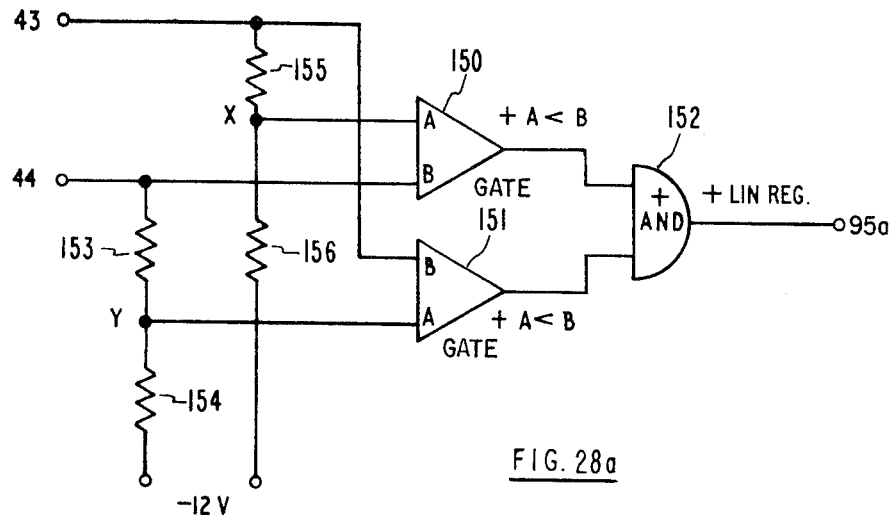
Figure 28B:
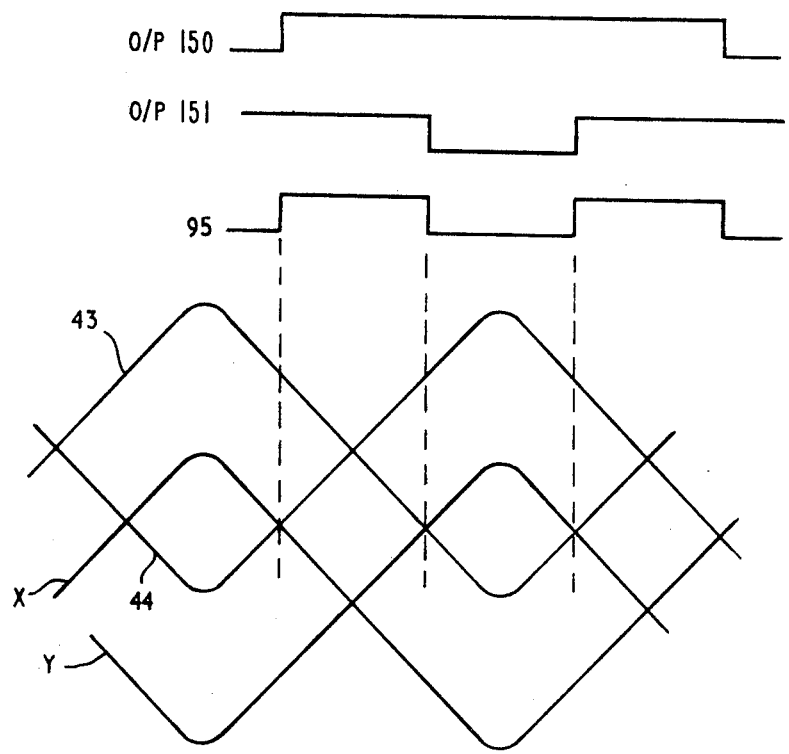
Figure 29:
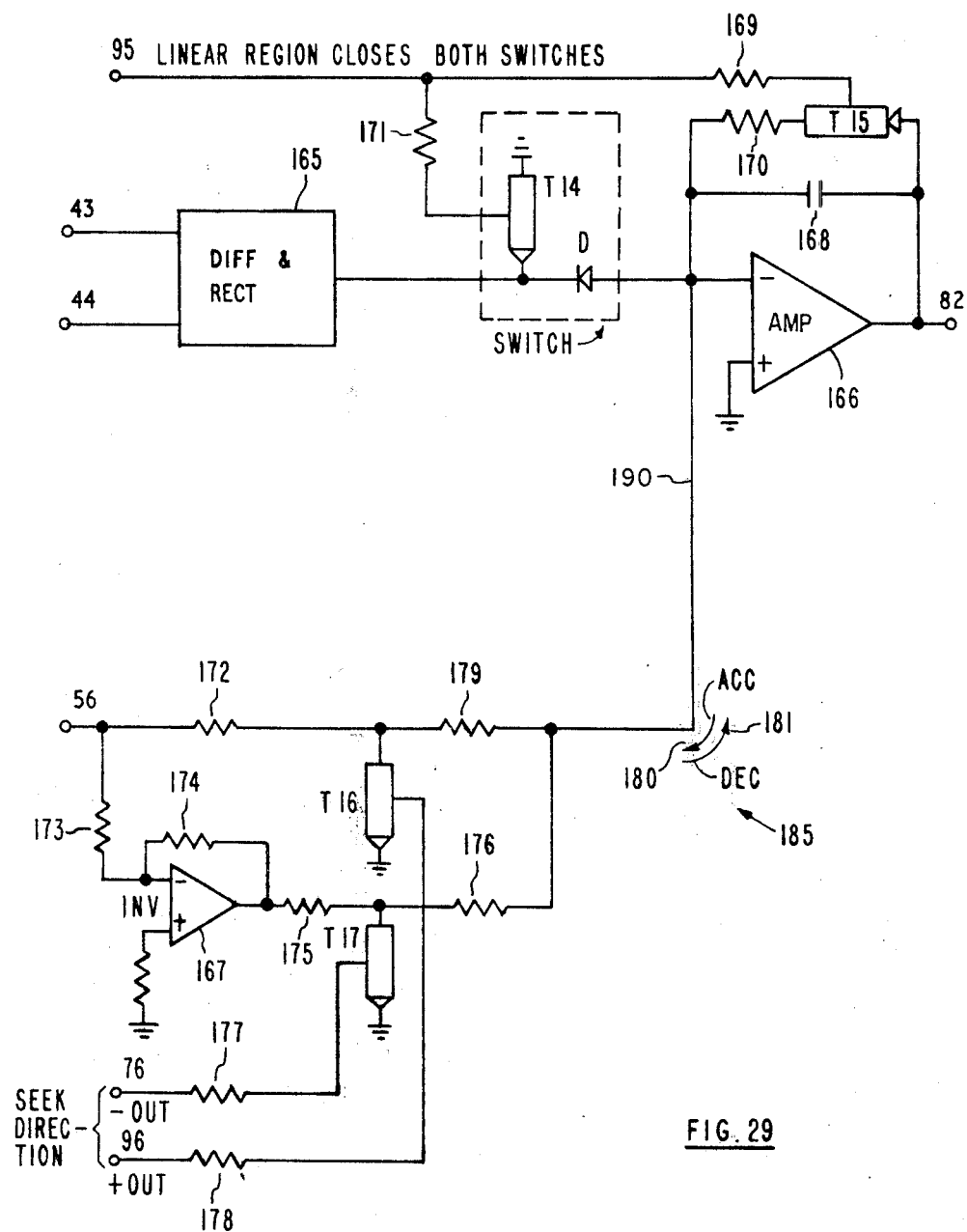
Figure 30:
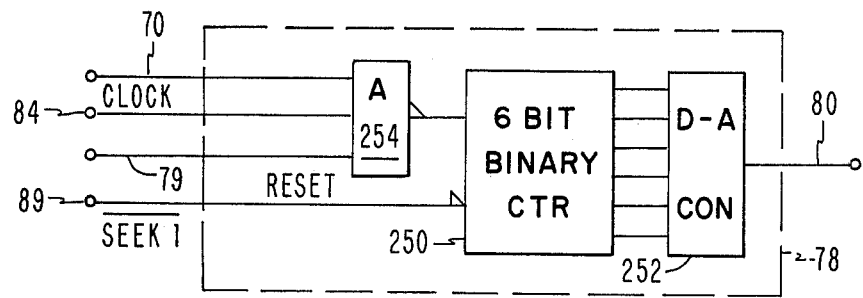

FIGS. 18a and 18b show a position error signal (the output of the FIG. 7 circuit) and the rectified derivative of this error signal, FIGS. 19a and 19b show a typical waveform of current applied to the actuator for the transducer of the data storage system and the integral of this current, FIG. 20 shows how a hybrid velocity signal is generated, FIG. 21 shows in block form the circuit for performing track access operations, FIG. 22 shows in block form a baseline control circuit, constituting a part of the FIG. 7 circuit, FIG. 23 shows a demodulator circuit constituting a part of the FIG. 7 circuit, FIG. 24 shows a threshold circuit, constituting a part of the FIG. 7 circuit, FIG. 25 is a graph showing the relationship between the gain and the frequency of the compensator circuit of FIG. 6, FIG. 26 shows in detail the driver circuit, constituting a part of the FIG. 6 circuit, FIGS. 27a, 27b and 27c are waveforms of the voltages on a divide circuit and a single shot circuit and also the input to the single shot circuit which are component parts of the block diagram of FIG. 11, FIG. 27d is a circuit diagram showing an equivalent circuit including a filter circuit component which is a part of FIG. 11, FIG. 27e is a graph showing the relationship between the gain and the frequency of the filter circuit of FIG. 27d, FIG. 28a is the diagram of a circuit producing the waveform of FIG. 13a, FIG. 28b shows waveforms of certain output voltages in the FIG. 28a circuit in conjunction with the waveforms of the output voltages of the FIG. 7 circuit, FIG. 29 is a circuit diagram of a hybrid velocity circuit shown generally in FIG. 21, and FIG. 30 is a circuit diagram of a velocity store circuit shown generally in FIG. 21.

Figure 1:
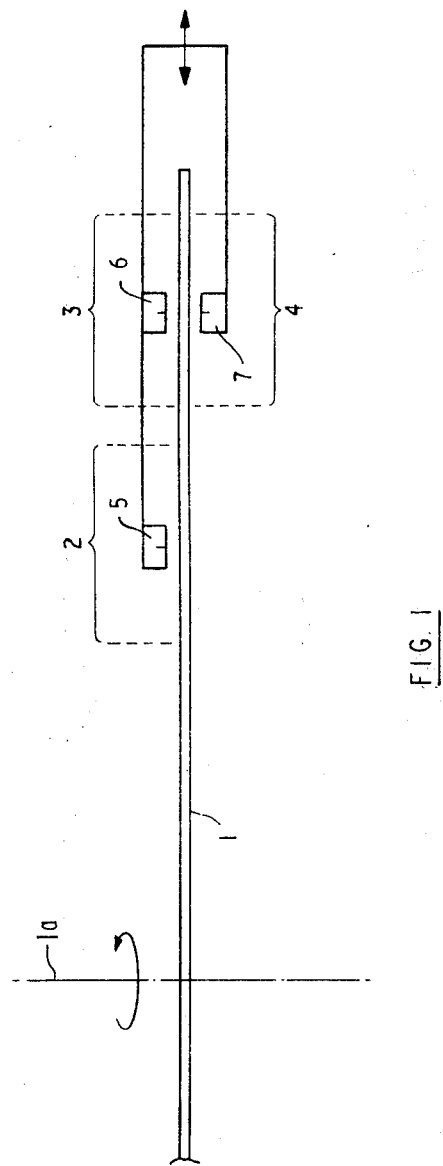

The data storage system incorporating the present invention is shown schematically in FIG. 1. Here, a magnetic disk 1 is shown, rotatable about a central spindle 1a and with two sets of concentric data tracks 2 and 3 on one surface and one set of concentric servo tracks 4 on the other surface. Data transducers 5, 6 are provided to read and write on the data tracks 2, 3; and a servo transducer 7 reads position information from the servo tracks 4. All three transducers 5, 6 and 7 are ganged together and are simultaneously moved over the surfaces of the disk 1 by a head positioning mechanism under the control of an external file control unit (FCU) which is not shown herein and which is a conventional unit.

The head positioning mechanism used in this apparatus consists briefly of a pivoted lightweight bifurcated arm with the data and servo transducers 5, 6 and 7 supported at one end and a voice coil actuator at the other end. The voice coil winding of the actuator is center-tapped, and energization of one-half moves the transducers 5, 6 and 7 in one direction across the tracks on the disk 1 and energization of the other half moves them in the opposite direction. Such a mechanism is described and claimed in co-pending application for letters U.S. Pat., Ser. No. 231,320, filed Mar. 2, 1972 (now U.S. Pat. No. 3,849,800, issued Nov. 19, 1974)

on "Magnetic Disk Apparatus," and details of construction will not be given herein and may be obtained by referring to said co-pending application.

FIG. 2 shows how the servo tracks 4 are encoded to provide position information. Two tracks 8, 9 are shown in the figure and are representative of a plurality of alternating odd and even circular concentric servo tracks extending across the entire bank of tracks 4. Various portions of the track 8, for example, are shown magnetized in one direction with shorter portions magnetized in the opposite direction. The directions of magnetization are represented in the figure by arrows. In contrast, the directions of magnetization of the long and short portions of track 9 between the same radial lines *a* are in the opposite directions to those in track 8 and to the adjacent track (not shown) on the other side.

A transducer positioned over a servo track experiences a flux reversal which produces a pulse in the transducer as each junction between different magnetic regions passes the transducer gap. The polarity and magnitude of the pulse is proportional to the magnitude and polarity of the flux reversal producing it.

The servo tracks are written with no gaps between them and, as can be seen from FIG. 2, magnetic flux reversals in one of the two directions (negative, on radial lines *a*) are aligned from one track to the next so providing continuous transitions of the same polarity radially across the disk 1. Disk 1 and tracks 8 and 9 are assumed to be moving in direction A. These transitions are used to provide clock pulses for the data channel as will be seen later. The flux reversals in the opposite direction (positive) shown on radial lines *b* on alternate tracks are staggered early and late about the aligned transitions *a*.

A servo transducer 7 positioned as shown in FIG. 2 symmetrically disposed above the boundary *c* between the two tracks 8, 9 sees negative clock pulses 10 and positive position pulses 11, 12 as the tracks pass the transducer gap. These pulses are shown in FIG. 3*a* from which it is seen that, provided the transducer 7 is accurately positioned over the boundary of two servo tracks; the position pulses 11, 12 will be of equal magnitude, and each will be half the magnitude of a clock pulse 10 produced by the aligned negative flux reversals *a*. Such a boundary *c* between two servo tracks, such as the two tracks 8 and 9, is called a guide path.

In the event that the servo transducer 7 moves out of its symmetrical position over the guide path or boundary *c* toward track 8, then the position pulse 11 will increase in magnitude with a corresponding decrease in magnitude of position pulse 12. The sum of the amplitude of the two positions pulses 11 and 12 will always be equal to the amplitude of the clock pulse 10, and the difference in amplitude between the two position pulses 11, 12 is proportional to the position error of the servo transducer 7 and correspondingly the two data transducers 5, 6 on the opposite side of the disk 1. The wave form illustrating this condition, in which transducer 7 has moved out of its symmetrical position over the guide path *c* toward track 8, is shown in FIG. 3*b*.

FIG. 3*c* shows the wave form resulting from displacement of the servo transducer 7 from the guide path *c* toward track 9. This time, the position pulse 12 is increased in amplitude at the expense of position pulse 11. Thus, an error signal derived from the difference between the two position pulses 11 and 12 indicates by its polarity the direction of displacement of transducer 7 and by its amplitude the magnitude of the displacement.

However, this position information is not unambiguous as reference to FIG. 4 will show. Here, three servo tracks 13, 14, 15 are shown with two servo transducers 16, 17 positioned over the two guide paths *d*, *e* with both of the transducers 16, 17 being misaligned in the same direction (toward the top of FIG. 4). The waveform of the pulses produced by the transducer 16 is shown in FIG. 5*a*, and the waveform produced by transducer 17 is shown in FIG. 5*b*. It is seen, therefore, that a displacement in one direction from an odd guide path produces an error signal (proportional to the differences in amplitude of position pulses 11*a* and 12*a*) to an identical displacement in the same direction from an even guide path. This is true, since the differences between position pulses 11*a* and 12*a* are the same in both cases. In FIG. 4, the guide paths *d* and *e* can be even and odd, respectively, or vice versa. Thus, circuitry responsive to position error signals for the purpose of realigning a transducer on a guide path must also be supplied with the additional information as to whether the displacement of the transducer is from an odd toward an even guide path or vice versa. This information is supplied from an external file control unit (FCU) which keeps count of tracks crossed by transducers during a track seek operation.

The system operates in two different modes, namely a track following mode and a track accessing or seeking mode. In the track following mode, the transducer 7 is maintained over and follows a single guide path on the disk while in track seeking mode the transducer 7 is moved from one guide path to another guide path.

A block diagram of the circuitry for completing a servo position loop (between servo transducer 7 and voice coil actuator 19 for arm 18 carrying transducer 7) is shown in FIG. 6. The servo position loop shown in FIG. 6 is mainly used in track following mode but parts of it are also used in track accessing mode. In this figure, the transducer positioning mechanism briefly referred to previously and with reference to co-pending application Ser. No. 231,320 is shown in schematic form. The servo transducer 7 is shown supported at one end of a lightweight pivoted arm 18 with a voice coil actuator 19 at the other end. The actuator consists of a center-tapped voice coil winding 20 which when energized interacts with the stationary magnetic field of the permanent magnet 21 to rotate the arm 18 about its pivot 22. In operation, the transducer 7 detects the pattern of servo tracks 4 on the disk 1 as explained above. The resulting signals are amplified by the preamplifier 23, which is carried on the end of the arm 18, and are fed to the position detect circuit 24. This circuit demodulates the position signals to produce a voltage proportional to the position error of the servo transducer 7. For the purpose of track following, this position error signal is fed to a compensator circuit 25 which stabilizes the servo response and from which the resulting signal is passed to a differential driver circuit 26. The driver circuit 26 converts the compensated position error signal from circuit 25 into a drive current which is supplied to the appropriate half of the voice coil winding 20 to move the arm 18 in a direction which reduces the position error of transducer 7.

A phase locked oscillator (PLO) not shown in this block diagram but which is subsequently described and is otherwise illustrated, locks onto the servo pattern (the output of transducer 7) and provides timing waveforms for the position detect circuit 24. The phase locked oscillator also multiplies the frequency existing in transducer 7 to produce a write clocking signal for a data channel connected with transducers 5 and 6 as will be more fully hereinafter described.

The circuitry completing the servo position loop shown in FIG. 6 will now be described in more detail with reference to other figures of the drawings.

POSITION DETECT CIRCUIT 24

The operation of this circuit will now be described with reference to the more detailed block diagram of the hardware shown in FIG. 7 and wave forms appearing at various parts of the circuit shown in FIG. 8.

The preamplified signals representing the servo pattern derived from the servo transducer 7 and amplified by the preamplifier 23 are further amplified by the variable gain amplifier 27 and are then passed through a filter 28 in order to remove noise outside the signal band width, which in this case is about 4MHz. The dc level of the signal output from filter 28 is set at −1.0 volt by baseline control circuit 29. A typical waveform 30 of a signal indicating a position error appearing at the output of circuit 29 is shown in FIG. 8. The wave form consists of positioned pulses 31, 32 and clock pulses 33. The pulses 31, 32 and 33 respectively correspond with the pulses 11, 12 and 10 previously described in connection FIGS. 3a to 3c. The difference in amplitude of the two position pulses 31, 32 provide the position error signal (at the output of position detect circuit 24 across terminals 43 and 44).

To obtain the position error signal at the output of circuit 24, one position signal (pulses 31) is supplied a first (IN) demodulator 34, and the other position signal (pulses 32) is supplied to a second (OUT) demodulator 35 under the control of gating pulses supplied on lines 45 and 46 from a phase locked oscillator in conjunction with an odd-even line 46a (see FIG. 11) from the FCU to be described later. The demodulator (demodulator 34 or demodulator 35) to which the position pulses are gated depends on whether the servo head 7 is trying to follow an odd or an even guide path (such as guide path c), as explained previously with reference to FIGS. 4 and 5. Each demodulator 34, 35 consists essentially of a capacitor which is charged rapidly to the peak value of the position pulse (pulse 31 or pulse 32) gated thereto and which decays slowly between the applied pulses. The outputs from the two demodulators 34 and 35 are shown in FIG. 8 respectively as wave forms 36, 37. These outputs are filtered differentially by resistors R1, R2 and capacitor C1 to smooth out the small steps produced when the positive peaks of the position signals 31, 32 applied to demodulators 34, 35 are stored on the demodulator capacitors. Finally, the outputs from the demodulators 34, 35 are passed through two buffer circuits 41, 42 which provide a low impedance drive for the position signal which then appears across the output linear terminals 43, 44 of the position detect circuit 24. The arrangement is such that, if the voltage on terminal 43 resulting from pulses 31 is more positive than the voltage on terminal 44 resulting from pulses 32, then the voice coil actuator 19 is energized so that the transducers 5, 6 and 7 are moved toward the spindle 1a of disk 1. If the terminal 44 is more positive than terminal 43, then the actuator 19 moves the transducers 5, 6 and 7 in the opposite direction, away from the spindle 1a of disk 1. For this reason, demodulator 34 is called the "in demodulator" and demodulator 35 is called the "out demodulator".

The transducer output and amplifier gain tolerances make it necessary to stabilize the circuit 24; and, therefore, the variable gain amplifier 27 is provided with an automatic gain control (AGC) voltage input on line 27c supplied from an AGC amplifier and filter 40 which is fed with a reference voltage derived from the output signal across terminasl 43, 44 and defined by resistors R3 to be the average of the signals 43 and 44.

The signals appearing at the output of circuit 29 are also supplied to a clock detect threshold circuit 49 arranged to detect negative transitions bigger than −1.86 volts. Reference to FIG. 8 will show that the output from this circuit on terminal 50 will be the clock pulses 33.

The servo signal read by the servo head 7 is, in fact, a differential signal appearing on the two output lines 7a and 7b (see FIG. 7). The signal appearing on line 7a, for example, is as shown, in FIG. 5a. The inverse of this appears simultaneously on the other associated line 7b. Likewise, similar output signals, one being the inverse of the other, appear at the outputs of circuits 23, 27 and 28 on lines 23a, 23b, lines 27a and 27b, and lines 28a and 28b.

The baseline control circuit 29 is illustrated in FIG. 22 and includes transistors T1, T2 and T3, operational amplifier 100, capacitors 101 and 102 and resistors 103, 104, 105, 106, 107, 108, 109, 110 and 111 connected as shown. The lines 28a and 28b constitute inputs to the circuit 29 and are connected particularly to the bases of transistors T1 and T2. The line 29a constitutes the output of circuit 29 and is connected to the demodulators 34 and 35 and to the clock detect circuit 49. The purpose of the circuit 29 is to set the base line of the servo signal wave form at −1.0 volt, instead of leaving it at some unknown quantity. Thus, the FIG. 8 wave form is normally, except for the pulses 31, 32 and 33 at −1.0 volt.

The transistors T1 and T2 (FIG. 22), together with their associated components, provide a further stage for the differential amplification of the input signals on lines 28a and 28b. A single output is taken from transistors T1 and T2, at the collector of transistor T1, and is applied onto the third transistor T3, which serves as a buffer to obtain a low impedance drive. The establishment of the baseline voltage of −1.0 volt on the output line 29a is achieved particularly by the amplifier 100, one input of which is tied to a −1.0 volt source. The effect of the amplifier 100 and the capacitor 102 is to integrate the difference between the signal including the pulses 30, 32 and 33 and the −1.0 volt reference signal, and this integrated signal from the output of amplifier 100 is fed back to the collector of transistor T2 through resistor 111 and to the collector of transistor T1 through resistors 111 and 107 and is arranged to be of the appropriate phase to correct the error in the baseline appropriately.

Figure 8:
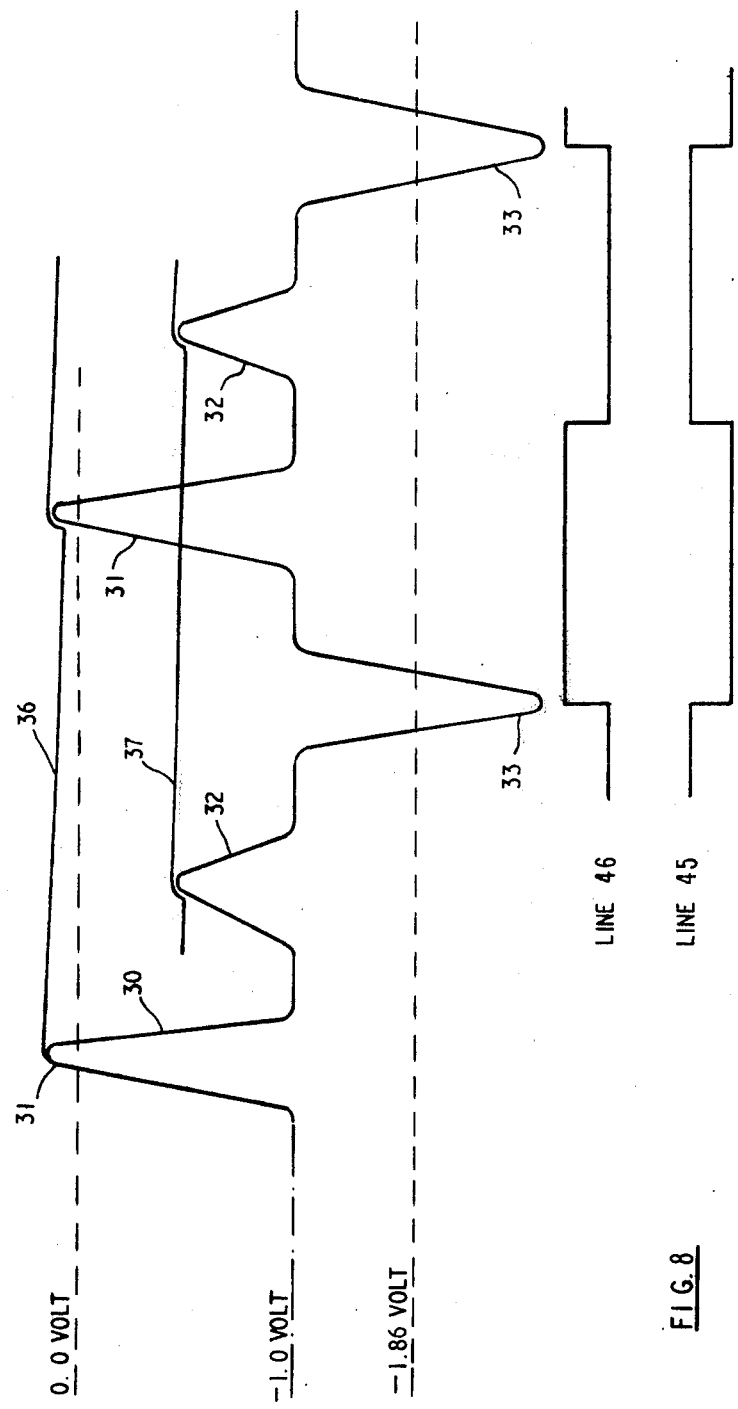

FIG. 8 shows a typical position error wave form 30 constituting the output of the baseline control circuit 29, and the position error is represented by the difference in the amplitude of the two position pulses 31 and 32. Since the polarity of the error signal 30 depends on whether the servo head 7 is on an odd or even guide path, the gating of the position error signals from the circuit 29 to the two demodulators 34 and 35 must be controlled accordingly. The gating signals on lines 45 and 46 (derived from a phase locked oscillator in conjunction with an odd-even line from the FCU) accomplish this gating function, and these are shown in conjunction with the wave form 30 on FIG. 8. The gating signals shown for lines 45 and 46 are for an odd guide path; and it will be appreciated that, for an even guide path, the signals on lines 45 and 46 would be inverted. That is, the signal shown on line 45 would be supplied to line 46 and vice versa. The arrangement is such that the position pulses 31 and 32 are gated by the down levels of the gating signals on lines 45 and 46.

The circuit of demodulator 34 is shown in FIG. 23 and includes transistors T4, T5 and T6, capacitor 115 and resistors 116, 117 and 118 connected together as shown. The position pulses 31, 32 on line 29a shown in FIG. 7 are supplied (under control of gate transistor T3 in the FIG. 22 circuit) to the emitter of transistor T4 which has its base strapped so that transistor T4 functions as a diode. A down level on line 45 causes transistor T6 to conduct so that the gated positive going pulses on line 29a are passed by transistor T4 to the base of matched transistor T5. The voltage at the emitter of transistor T5 tries to follow the voltage on the base of transistor T5, resulting in capacitor 115 being charged by the positive going voltages. The RC values of the FIG. 23 circuit is such that transistor T5 is held off until the arrival of the next positive pulse gated by transistor T6.

Demodulator 35 is identical to demodulator 34 except that it takes its input from line 46 instead of line 45. Demodulator 35 functions similarly as demodulator 34.

The outputs from the two demodulators 34 and 35, shown as wave forms 36 and 37 in FIG. 8, are filtered differentially by resistors R1, R2 and capacitor C1 in FIG. 7. The component values of R1, R2 and C1 are such as to give a roll off differential signal at 7 KHz and above.

Clock detect circuit 49 is shown in detail in FIG. 24 and consists of two transistors T7 and T8 connected in a common emitter configuration. A transistor T9 is connected to the collector of transistor T8, and the collector of transistor T9 provides the servo clock signal on terminal 50. The FIG. 24 circuit also includes the biasing resistors 125, 126 and 127 connected with the transistors of the circuit as shown.

A reference signal of −1.86 volts is supplied to the base of transistor T7, and the tri-bit signal from baseline control circuit 29 is supplied to the base of transistor T8. The transistor T9 constitutes the output transistor of the circuit 49 and has its base connected to the collector of transistor T8. The circuit 49 has the effect of comparing the voltage of the tri-bit signal on line 29a with the −1.86 reference voltage. Thus, whenever the voltage of the tri-bit signal on line 29a falls below −1.86 volts, transistor T8 switches OFF, and transistor T9 switches ON. The servo clock signal on terminal 50 therefore appears as a number of negative going pulses on the output line from the collector of transistor T9. Thus, only the clock pulses appear on terminal 50.

COMPENSATOR 25

Figure 9:
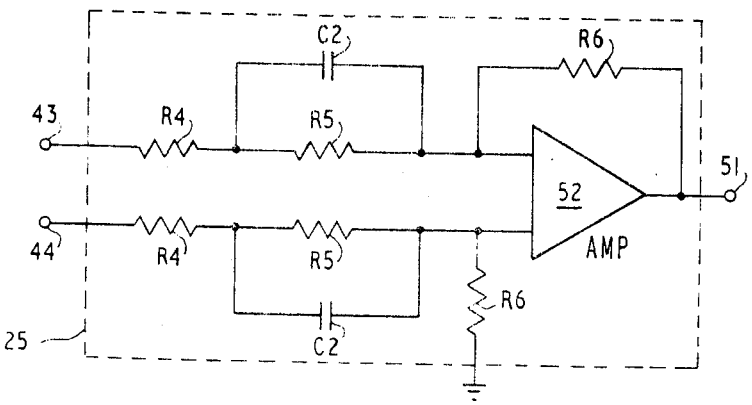

The compensator 25 shown in FIG. 9 converts the differential position error signal appearing across terminals 43, 44 into a single ended output at terminal 51 either positive or negative, as required by the driver circuit 26. The FIG. 9 circuit is a straight forward lead-lag compensator using an operational amplifier 52. At low frequencies, the capacitors C2 of FIG. 9 can be ignored, and the gain is equal to R6/(R4+R5). At high frequencies, the capacitors C2 of FIG. 9 act as short circuits; and the gain is R6/R4. In this particular arrangement, the low frequency gain is three-fourth, and the high frequency gain is 4.5. The characteristics of the compensator 25 are shown in FIG. 25; and it will be observed that the gain below 113HZ is three-fourth, while the gain above 678HZ is 4.5.

DRIVER CIRCUIT 26

The error signal from the compensator 25 on terminal 51 is supplied to differential driver 26 from where it is directed to cause current to flow through one or the other half of voice coil 20 to move the arm 18 carrying the transducers 5, 6 and 7 in a direction to reduce the error (during track following). The differential driver 26 (see FIG. 10) consists of an IN driver 53 and an OUT driver 54. The arrangement is such that, as the signal on input 51 goes positive, the OUT driver 54 draws current through the half of the voice coil 20 to move the transducers 5, 6 and 7 away from the spindle 1a of the disk 1. Conversely, as the signal at input 51 goes negative, IN driver 53 takes over; and the other half of the winding 20 is energized to move the transducers 5, 6 and 7 in the opposite direction toward the spindle 1a of disk 1. In its simplest form, the IN driver 53 consists of a transistor cross coupled to an identical transistor in the OUT driver 54. The differential nature of this circuit is represented by the doubleheaded arrow 54a shown connecting drivers 53 and 54. Thus, a large positive error signal on terminal 51 produces high current in winding 20 and high acceleration of the actuator 18 in one direction; and a large negative error signal produces a high current and a high acceleration in the opposite direction. The crossover from one half of the drive circuit 53, 54 takes place of course when the input to the FIG. 10 circuit is 0 volts.

Figure 10:
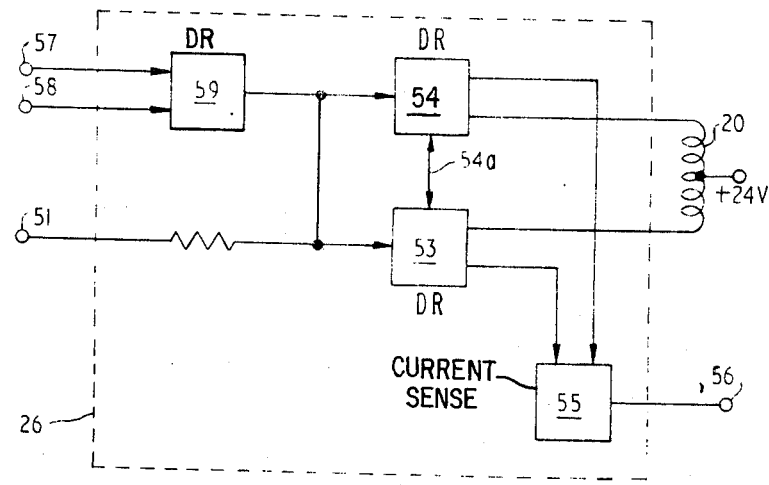

The description given so far of the FIG. 10 circuit is concerned with maintaining the servo transducer 7 symmetrically positioned above a guide path and consequently the data transducers 5 and 6 on track, so that read/write operations may be performed. It is also necessary to move the transducers 5, 6 and 7 across tracks under the control of track access commands from the control unit (FCU) which is external with respect to the disk 1 and its control described herein and is not shown.

The servo arrangement as so far described also plays a part in a track access or "seek" operation during which time, for example, it is necessary to control the access velocity of the arm 18 as it moves over the tracks 4 to its destination and also to keep a count of the number of tracks 4 crossed. The file as so far described sends track crossing pulses to the FCU which enable it to know where the transducer 7 is at any particular time. The file also sends a "seek complete" pulse to the FCU at the end of each access operation when the transducers 5, 6 and 7 revert to track-following mode.

During a track seek operation, the direction of movement of the arm 18 is controlled by signals on direction lines to either the "IN terminal" 57 or the "OUT terminal" 58 (see FIG. 10) which in turn cause access driver 59 to supply signals of appropriate polarity to the two drivers 53, 54. During track seek operation, the drivers 53 and 54 are driven hard in one direction or the other under control of access logic to be described later.

In order to control the velocity of access across tracks, it is necessary to know the instantaneous velocity of the arm 18. This is obtained in part by monitoring the current through the two halves of the voice coil winding 20. A current sense circuit 55 is shown in FIG. 10 connected to the two drivers 53, 54 and produces a corresponding current to that through the winding 20 in its output 56. How the current is used to indicate the velocity of the arm will be explained later.

The differential driver 26 is shown in detail in FIG. 26. From this figure, it can be seen that the IN driver 53 consists of a power transistor T14 driven by an operational amplifier 125, and resistors 126, 127, 128 and 129 are connected with the amplifier 125 and transistor T14 as illustrated to complete the IN driver 53. The OUT driver 54 is similar in detail to the IN driver 53 and comprises transistor T13 and operational amplifier 130, and resistors 131, 132 and 133 are connected with the amplifier 130 and transistor T13 in the manner shown to complete the circuitry of the driver 54.

In the operation of the IN driver 53, the emitter current in the transistor T14 is sensed across series resistor 129 and is supplied as negative feedback to the amplifier 125 to control the gain of the circuit 53. The OUT driver 54 functions in substantially the same manner as the IN driver 53. The phasing of the input connections to the amplifiers 125 and 130 are such that IN driver responds to negative input signals on input 51, and OUT driver responds to positive input signals on input 51.

Driver 59 comprises transistors T10, T11 and T12 and resistors 140, 141, 142, 143 and 144 connected as shown in FIG. 26.

During a track seek operation, as opposed to a track "follow" operation, the signals on terminal 51 are overridden by a signal on IN terminal 57 or OUT terminal 58, depending on the direction of access required. The arrangement is such that a negative signal on terminal 57 results in the voice coil 20 being energized to move the transducers 5, 6 and 7 toward the spindle 1a of disk 1, and a negative signal on terminal 58 causes the transducers 5, 6 and 7 to move away from the spindle 1a of disk 1. The generation of signals on terminals 57 and 58 will be hereinafter explained with reference to FIG. 21. At this time, it is sufficient to note that a negative signal on terminal 58 causes transistor T10 to conduct, swamping any signal on terminal 51; and a negative signal on terminal 57 causes level shift transistor T12 to conduct, which in turn switches on transistor T11 to also swamp any signal on terminal 51.

The current sense circuit 55 is shown in FIG. 26 as including an amplifier 145. Circuit 55 produces on its output terminal 56 a voltage which is proportional to the current in the actuator coil 20 which in turn is proportional to the acceleration coil 20 produces on arm 18 and transducers 5, 6 and 7 moving across disk 1. The voltage on terminal 56 is used to generate a hybrid velocity signal required to control head accesses as will be described with reference to FIG. 21, and details of the production of the hybrid velocity signal will be given later. The current through the actuator coil 20 could, of course, be established by monitoring the collector currents of transistors T13 and T14. However, it has been found more convenient to sample the emitter current of each of the transistors T13 and T14 and subtract the base current of the transistor which gives a value equal to the collector current of each transistor. This is achieved by the three connections to each side of the amplifier 145 which was simplified in FIG. 10 to show only two inputs to circuit 55 rather than the six inputs actually required for this approach and shown in FIG. 26.

PHASE LOCKED OSCILLATOR "PLO"

The phaselocked oscillator (PLO) which provides the write clocks for the data channel and gating signals on lines 45 and 46 is shown in simple form in FIG. 11. Basically, the PLO consists of a voltage controlled oscillator 60 which runs at about 14MHz and produces a 2F write clock signal at output terminal 61. This signal is divided by 2 by trigger 62 and again by 16 by counters 63. This results in a signal of similar frequency to the servo clock signal on terminal 50 of the position detect circuit 24 (see FIG. 7). The servo clock signal appearing at terminal 50 is used as a phase reference and is supplied as an input to a single shot 64 shown in FIG. 11. The phases of the signals from the counters 63 and single shot 64 are compared in a phase compare circuit 65 which generates an output signal representing the phase error between the divided oscillator output and the servo clock signal on terminal 50. This error signal is supplied to a filter network 66 which, when fed to the oscillator 60, modifies its output in a direction which tends to reduce the detected phase error. In this manner, the write clock signal on terminal 61 is synchronized with the servo clock signal on input terminal 50 of the FIG. 11 circuit.

The phase compare circuit 65 and the filter 66 shown in FIG. 11 are conventional. The phase compare circuit 65 is simply a collection of gates arranged to indicate whether the output from single shot 64 representing servo clock pulses (on terminal 50) is early or late compared with the output from divider 63 and, if so, by how much.

FIG. 27a shows the oscillator wave form output from divider 63 and the single shot output wave form from single shot 64 in response to the servo clock pulses applied to input terminal 50 of the FIG. 11 circuit. The object is to control the voltage controlled oscillator 60 so that it is in synchronism with the servo clock pulses on input terminal 50. This is accomplished by comparing the trailing edges of the pulses from divider 63 and single shot 64 by means of the phase compare circuit 65. From FIG. 27b, it will be seen that the logical detection of $63, \overline{64}$ (the positive output of single shot 64 and the inverted output of divider 63) by means of phase compare circuit 65 will produce a pulse whose duration is a measure of the error of the output pulse from the oscillator 60 when the pulse is too early compared with the pulse on terminal 50. FIG. 27c shows that logical detection by the phase compare circuit 65 of the condition $63, \overline{64}$ (the positive output of divider 63 and the inverted output of single shot 64) produces a similar pulse when the output pulse of oscillator 60 is too late. Logically connected gates are used in phase compare circuit 65 for detecting these conditions.

The logical arrangements (the output pulse of oscillator 60 either early or late) have been shown schematically in FIG. 27d as simple switches. Switch 1 is closed when the output pulse of oscillator 60 is late with respect to the pulse on input terminal 50, and switch 2 is closed when the output pulse from oscillator 60 is early. The effect of closing these switches is to produce current flow in the direction shown by the arrows in FIG. 27d, thus increasing or decreasing the voltage on capacitor 146 (see FIG. 27d) in the filter circuit 66.

This voltage (on the output 66a of filter circuit 66) is used to control the voltage controlled oscillator 60 in a conventional manner.

The filter circuit 66 comprises, in addition to the capacitor 146, a capacitor 147 and a resistor 148 connected as shown in FIG. 27d. The characteristics of the filter circuit 66 are shown in FIG. 27e.

The phase locked oscillator PLO shown in FIG. 11 also generates the demodulator gating signals on lines 45 and 46 used as inputs in the FIG. 7 circuit and shown as wave forms in FIG. 8. These signals on lines 45 and 46 are produced by gate 65a having two inputs, one of which is the output of the divider 63 and the other of which is the odd/even line 46a. The outputs of the gate 65a are the lines 45 and 46. The signal on the line 45 is identical with the signal output of the divider 63 with the odd/even signal on line 46a from the FCU being at a certain level. When the level on the odd/even line 46a is changed by the FCU, the signal on the line 45 is inverted. The signal on the line 46 is always the inverse of the signal on the line 45.

FIG. 12 is a plot of the voltage Ev of the servo error signal between terminals 43 and 44 (see FIG. 7) against guide paths on the servo side of disk 1 corresponding to data track positions t crossed by the transducers 5 and 6 during a track seek operation. Starting at the on-track position P1, the error signal Ev increases from zero to a maximum at P2 halfway between tracks, and reduces to zero again at P3, the next on-track position. The error signal Ev then goes negative, reaching a maximum at P4 and returning to zero at the next on-track position P5 and so on. The rounding of the peaks of the error signal at P2 and P4 is caused by imperfect resolution and magnetic fringing of transducer 7.

Two logic signals required to control access or track seek operations and having the signal levels shown in FIGS. 13a and 13b are derived from this error signal across lines 43 and 44. The signal shown 95 in FIG. 13a represents by its up level the linear portions of the error signal Ev between lines 43 and 44. In practice, this portion extends over ±25% of each track about each on-track position. Thus, as can be seen from FIG. 12 and FIG. 13a, the linear regions exist for about 50% of the surface of disk 1 and have a nominal slope of four volts per track.

The second logic signal shown by FIG. 13b represents by its up-level the on-track position. This signal is used for counting the number of tracks crossed during a track access operation by the (FCU) and for checking positional accuracy of head 7 and thus of heads 5 and 6 during writing. The on-track signal of FIG. 13b disappears if the servo transducer 7 moves more than 300 microinches away from the on-track position.

The circuitry for generating the two wave forms shown in FIGS. 13a and 13b is shown in FIG. 28a. This circuitry includes two gates 150 and 151 having their outputs connected to AND circuit 152. The circuitry includes also resistors 153, 154, 155 and 156 connected with the other circuit components as illustrated. The two inputs to the FIG. 28a circuit are the terminals 43 and 44 constituting the outputs of the position detect circuit 24 (see FIG. 7), and the output is on a terminal 95. Gate 150 gives a positive output when the input at the A terminal of gate 150 is less than the input at the B input of gate 150 (this condition is illustrated in FIG. 28b). Gate 151 gives a positive output when the input at its A terminal is less than the input at its B terminal (this condition is also illustrated in FIG. 28b).

FIG. 28b may be seen to include the wave forms of the signals at the input terminals 43 and 44, at the outputs of gates 150 and 151, at points X and Y in FIG. 28a and at the output terminal 95a of the FIG. 28a circuit. The latter signal 95 is also shown in FIG. 13a. It will be apparent that the extent of the linear region of the voltage at terminal 95 is defined by the values of the resistors 153 to 156 which define the X and Y wave forms, and the output from the AND gate 152 on terminal 95 is at an up-level for the duration of the linear regions of the signals on terminals 43 and 44. It will be understood that a circuit similar to that shown in FIG. 28a with different valued circuit compenents can be made to give pulses representing the on-track condition as shown in FIG. 13b.

During a track access operation, the speed of the arm 18 must be controlled in order that the position loop can capture the arm 18 and hold it on track with the transducer 7 at the required destination. If the approach speed of the arm 18 is too high, then overshoot will occur. A suitable approach speed or "capture velocity" for this particular apparatus has been found to be about 2.9 milliseconds per track. Clearly, to perform the whole access at this speed would result in a poor access performance; and, therefore, the majority of the access is at a higher speed with a suitable retardation to the capture velocity near the end of the access.

A typical velocity profile for this apparatus performing an access of eight or more tracks is shown in FIG. 14a with the resulting servo error signal Ev shown below as in FIG. 14b. The velocity profile may be seen to consist of the following three phases:

1. An acceleration phase (track 0 to track 3). During the first three tracks of an access, one of the voice coil drivers 53, 54 (FIG. 10) is saturated thereby overriding the position loop error signal appearing at terminal 51 (FIG. 9) and causing the arm 18 to be accelerated at the maximum rate for that particular actuator mechanism used. The voice coil driver 53, 54 is saturated with either of the transistors T10 and T11 switched ON, as explained previously. The generation of the signals on terminals 57 and 58 of the FIG. 26 circuit is in response to various control signals from the external file control unit (FCU) to which the disk drive is connected. Which driver 53, 54 is selected will of course depend on the desired direction of access.

2. A constant velocity phase (track 3 to track N-5, where N is the target track). During all but the last five tracks of the access, the arm 18 is maintained at a uniform velocity Vs equal or substantially equal to the velocity achieved after the acceleration phase during the first three tracks. This is accomplished by storing the achieved velocity Vs and thereafter selecting either coil driver 53, or 54 as the actual instantaneous velocity falls below or exceeds the stored value Vs. The inductance of the voice coil 20 prevents excessive current during this phase.

3. A retardation phase (from track N-5 to track N). Five tracks from the target track N, the stored velocity Vs is replaced by the capture velocity Vc which causes hard retardation until the arm 18 is moving at the capture velocity Vc. The arm is maintained at this capture velocity until it reaches the linear region of the FIG. 12 waveform at the target track N. At this time, the access driver 59 (FIG. 10) is deselected, and the position loop electronics captures the arm 18 and positions it on track as previously explained. The position loop electronics continues to hold the arm 18 on track until another access is required.

The capture velocity Vc is the maximum permitted velocity of the transducers 5, 6 and 7 a quarter of a track away from the destination track N if the head 7 is to be captured by the servo loop to track follow over that track. It is convenient to express the capture velocity Vc as the time taken to cross a track, which is 2.9 milliseconds per track in the particular embodiment of the invention disclosed. The constant, 2.9 milliseconds per track can be expressed in other ways, for example, as 0.34 tracks per millisecond or 340 tracks per second, but the constant of 2.9 milliseconds per track is considered the simplest and most meaningful. The capture velocity is determined by calculations involving the dynamics of the whole system and is a constant applicable regardless of the number of tracks crossed by transducer 7 in a track access operation.

Selection of the three phases above-mentioned is determined by access control signals supplied by the external control unit (FCU) in two logic lines known as Seek 1 and Seek 2 lines. The voltage changes on these lines required to cause the arm 18 to follow the velocity profile in the above three mentioned phases are shown in FIGS. 14c and 14d respectively. There is a latch known as the "velocity follow latch" (VFL) 200 which is shown in FIG. 21 and will be subsequently described. Latch 200 is set when the Seek 2 signal is raised and remains "up" until the next linear region of the error signal Ev of FIG. 12 is entered after the Seek 2 signal is lowered as shown in FIG. 14e.

At this time, the arm 18 is controlled by the position error signal Ev appearing across terminals 43 and 44 and subsequently on terminal 51. Referring to FIGS. 14a–14d, the arm 18 is accelerated when the Seek 1 signal is up and the Seek 2 signal is "down"; the arm 18 is driven at a uniform velocity Vs when both Seek 1 and Seek 2 signals are up; the arm 18 is retarded when the Seek 1 signal is down and the Seek 2 signal is up; and the track following electronics takes over when both Seek 1 and Seek 2 lines are down and the VFL is reset.

FIGS. 15a to 15d show how accesses of three to seven tracks are controlled. The velocity profile of the arm 18 is shown as FIG. 15a; the position error signal access terminals 43 and 44 as the tracks are crossed is shown as FIG. 15b; and the controlling Seek 1 and Seek 2 signals are shown as FIGS. 15c and 15d respectively. In this case, the acceleration phase has been reduced from three tracks to one track. The arm velocity Vsl (which is less than velocity Vs due to the shorter time of acceleration) attained after accelerating for one track is stored as before, and the arm 18 is maintained at this velocity Vsl until the retardation phase is reached. The retardation phase commences, in this case, two tracks from the destination track and slows the arm 18 to the capture velocity Vc in sufficient time for the position loop electronics to capture the arm 18 to track follow during the final phase. In this case, the Seek 1 line is up when movement of the arm 18 commences and goes down when the transducer 7 crosses the N-2 track. The Seek 2 signal goes up when the first track is crossed by the transducer 7 and goes down when the transducer 7 crosses the N-1 track.

With track accesses for one or two tracks only, the velocity of the arm 18 is limited to the capture velocity Vc. FIG. 16a shows the velocity profile of the arm 18; FIG. 16b shows the position error signal Ev; FIG. 16c shows the Seek 1 signal; and FIG. 16d shows the Seek 2 signal; all for a two track access. This time, the Seek 1 and Seek 2 lines rise together, thereby eliminating the acceleration phase, causing the velocity of arm 18 to be limited to the capture velocity Vc, until both Seek 1 and Seek 2 lines fall, and the VFL is reset, permitting the position loop electronics to capture the arm 18 as in the previous examples.

Finally, the control for a single track access is shown in FIGS. 17a to 17d, and is substantially the same as for the two track access just described. FIG. 17a shows the velocity profile of the arm 18, and FIG. 17b shows the position error signal Ev for this single track access.

Since all of the disk file accesses are controlled from the file control unit FCU (not shown), a number of interface lines are required between the disk file as illustrated in the drawings hereof and the non-illustrated file control unit FCU. These interface lines are the following:

Seek 1 and Seek 2 lines (previously mentioned, see FIGS. 14c and 14d, for example).

On track line (see FIG. 13b) supplying track crossing pulses to the external file control unit FCU.

Seek-complete line supplying a signal to the external file control unit FCU at the end of an access operation to enable a read/write operation to be started.

Odd/even line 46a (see FIG. 11) supplying signal levels to the disk file demodulators 34 and 35 to indicate whether the target track N is to be an odd or an even track, thus insuring the correct polarity of the position error signal Ev.

Seek direction (−OUT) line 76 and its inverse (+OUT) line 96 (FIGS. 21 and 29) indicate the direction of the access to be performed. An out-seek is away from the spindle 1a of disk 1 in the direction of increasing track address, and an in-seek is toward the spindle 1a of disk 1.

From the above outlines of the methods of performing the various track accesses, it is seen that the instantaneous value of the velocity of the transducer 7 must be known during an access. This value is obtained electronically from two sources, the position error signal Ev across lines 43 and 44 generated as the servo transducer 7 crosses the tracks 4, and the current supplied to the voice coil 20 during the access.

The amplitude of the position error signal Ev is proportional to the position of arm 18; consequently, the velocity of the arm 18 is proportional to the derivative of the linear portions (see FIG. 12) of the position error signal Ev:
   ie. velocity $\propto dEv/dt$ FIG. 18a shows a typical error signal Ev resulting from a track access operation, and its rectified derivation $dEv/dt$ is shown below as FIG. 18b. The derivative signal is only useful over its linear regions and is accompanied by noise resulting from the differentiation process. This noise is reduced to an acceptable level by passing the derivative signal through a low pass filter having a cutoff at 400Hz.

The voice coil current Ic (through voice coil 20) is proportional to acceleration of the transducers 5, 6 and 7; and, therefore, the velocity of arm 18 is proportional to the integral of the current through coil 20 with respect to time:
   ie. velocity $\propto \int Ic\, dt$ A typical wave form of current through voice coil 20 is shown in FIG. 19a. This waveform includes the acceleration phase P5, uniform velocity phase P6, retardation phase P7, a short time P8 at the capture velocity, and finally track following phase P9. The integral of this waveform $\int Icdt$ is shown in FIG. 19b and theoretically gives the velocity of the transducers 5, 6 and 7. However, the integration process is subject to dc drift as shown by the dotted waveform in FIG. 19b. Here, it is seen that the largest error E occurs at the most critical time at the end of the access operation.

Although both sources (1. The error signal Ev generated as the transducer 7 crosses the tracks, and, 2. The current supplied to the voice coil 20 during access) have individual disadvantages; when they are combined, an actual instantaneous true velocity signal Va for arm 18 can be obtained.

A hybrid velocity signal, which at any given time is the instantaneous velocity signal Va, for arm 18 is produced as illustrated generally in FIG. 20 and constitutes the straight horizontal line Va shown in this figure. For linear regions of the error signal Ev (FIG. 12), the instantaneous velocity signal Va is produced by summing the $dEv/dt$ signal 67 below 400Hz with the $\int Icdt$ signal 68 above 400Hz, producing the horizontal signal line Va as seen in FIG. 20. For nonlinear regions of Ev, the integrated current as shown in FIG. 19b is used alone. The integrated current $\int Icdt$ can be used during the nonlinear regions of the error signal Ev because it does not have time to drift very far during the relatively short times it is used as a velocity signal.

The circuitry 185 for producing the hybrid velocity signal illustrated in FIG. 20 is shown in FIG. 29. The FIG. 29 circuit includes a differentiator and rectifier 165, transistors T14, T15, T16 and T17, amplifiers 166 and 167, a capacitor 168, resistors 169 – 179, and diode D all connected together as shown in FIG. 29. The differentiator and rectifier 165 is described in the International Business Machines Technical Disclosure Bulletin, Volume 16, No. 5, Oct., 1973, page 1669, and has the terminals 43 and 44 (see FIG. 7) as inputs. The amplifier 166 has the output terminal 82; the amplifier 166 has the input terminal 56; the base of transistor T16 is connected to terminal 96 and the base of transistor T17 is connected to terminal 76. The collector of transistor T16 is connected through resistor 172 with terminal 56, which is the output terminal of the current sense circuit 55 (see FIG. 10). Transistor T14 has its base connected through resistor 171 with line 95 (see also FIG. 28a).

The position error signal Ev representing displacement of arm 18 is differentiated and rectified by the circuit 165. The transistor T14 is off for the duration of the linear region of the position error signal Ev allowing the differentiated and rectified position error signal to the inverting amplifier 166 through diode D. The transistor T15 in series with resistor 170 is on during the linear regions of the position error signal Ev so that capacitor 168 and resistor 170 act as a low pass filter having a rolloff at 400Hz. The low frequency component of the hybrid velocity signal is therefore supplied to the output terminal 82 by the differentiated position signal Ev over the linear portions of the position error signal Ev.

A signal representing the current through the coil 20 is obtained from terminal 56 as has been previously described with respect to the driver 26, particularly with reference to FIG. 26. The direction of the current through the coil 20 depends on whether the actuator arm 18 is being driven toward or away from the spindle 1a of the disk 1. When the actuator arm 18 is moving toward the spindle 1a, for example, the current from terminal 56 is taken unchanged to amplifier 166, where, during the nonlinear regions of the position error signal Ev resistor 170 is disconnected by the transistor T15; and capacitor 168 across the amplifier 166 acts as an integrator. The velocity signal during the nonlinear regions of the position error signal Ev thus appears at the output terminal 82 to fill in the gaps in the signal produced by differentiating the position error signal by means of the differentiator 165. When the actuator 18 is moving away from the spindle 1a, for example, the current from terminal 56 is inverted by the inverter 167, before being supplied to amplifier 166. Whether normal or inverted current is supplied to the amplifier 166, it is under control of the two transistors T16 and T17, acting as switches, operated by direction lines 76 and 96 derived from commands issued by the FCU. It will be apparent that the resulting direction of the current flow through line 202 indicates whether the arm 18 is being accelerated or retarded, this being indicated by arrows 180 and 181 for the case of an OUT move away from spindle 1a.

It will be noted that the acceleration signal (on line 190) is also applied onto the amplifier 166 during the linear regions of the error signal Ev. During this time, resistor 170 serves to roll off the integrated current signal $\int Icdt$ below 400Hz as required by FIG. 20.

The block diagram for the velocity control system for performing track access operations is shown in FIG. 21 and will now be described.

Acceleration Phase

An AND gate 199 responds on receipt of the Seek 1 signal and the $\overline{\text{Seek 2}}$ signal (the reverse of the Seek 2 signal) to supply an accelerate signal on line 70. This signal is passed by OR gate 71 (having two inputs) to the coil driver 26 to saturate one-half 73 or the other half 74 of the voice coil 20 to produce maximum acceleration of the arm 18 over the tracks on disk 1 in the desired direction. The direction of access is determined by gating circuit 75 controlled by a direction signal on line 76 or line 96 from the external file control unit (FCU).

Gate 75 comprises AND gates 202 and 204 appended onto OR circuit 206 and AND gates 208 and 210 appended onto OR circuit 212. The outputs of the OR circuits 206 and 212 are respectively an "in drive" line 57 and an "out drive" line 58. The inputs to the AND circuits are the seek direction lines 76 and 96 and the outputs of OR circuit 71 and AND circuit 86. When the direction of seek is away from the spindle 1a, the output of circuit 71 is gated through to line 58 and the output of gate 86 is gated through to line 57. Lines 57 and 58 energize the coils 73 and 74 through the driver 26 respectively. When the direction of seek is towards the spindle (an in seek), gate 75 gates the output of gate 71 to line 57 and the output of gate 86 to line 58; and the coils 73 and 74 are energized oppositely from before by driver 26.

The accelerate signal on line 70 is also supplied to the velocity store 78 to put it into a store mode. The actual velocity achieved by the tranducers 5, 6 and 7 is stored in the velocity store 78. The velocity store 78 includes a six bit counter register 250 (See FIG. 30) which is incremented by clock pulses on terminal 84 derived from a suitable constant frequency oscillator (not shown) under control of the signal on gate line 79. That is, when the signal on line 79 is "up", the clock pulses on terminal 84 are permitted to increment the six bit counter register 250; and, when the signal on line 79 is down, the clock pulses on terminal 84 are not permitted to increment the 6 bit counter register.

A digital to analog converter 252 is a part of the store 78 and is connected to the six bit counter register 250; and, in forming part of the store 78, supplies an analog voltage on the output line 80, the magnitude of which is directly proportional to the digital value stored in the 6 bit counter register 250. Referring to FIG. 30, the store 78 may be seen to comprise an AND circuit 254 which has the lines 70 and 79 and the terminal 84 as inputs. The output of the AND circuit 254 is to the 6 bit binary counter 250, and the counter 250 also has the terminal 89 carrying the SEEK 1 RESET signal applied to it. The output from the store 78 is supplied through output line 80 to a comparator 81. A voltage Va representing the actual instantaneous velocity of the arm 18 during an access generated as explained previously is supplied to the second input 82 of the comparator 81. This velocity is supplied from the hybrid velocity circuit 185 which is shown in detail in FIG. 29. The output from the comparator 81 is digital and "up" if the stored velocity signal in store 78 is less than the actual instantaneous velocity signal from hybrid velocity circuit 185 and down when the stored velocity signal in store 78 is greater than the actual instantaneous velocity signal from hybrid velocity circuit 185. The output from the comparator 81 is supplied on line 79 (which is connected to a gate input of the velocity store 78). Thus, during this phase (the acceleration phase) of the access operation, the input on gate line 79 will go up to cause the clock pulses on terminal 84 to increment the six bit counter register, always trying to make the stored velocity in store 78 equal to the actual velocity of the arm 18 supplied on terminal 82. At the end of the acceleration phase, the output from the store 78 will be equal to the actual instantaneous velocity of the arm 18. The accelerate signal on line 70 is terminated by the raising of the Seek 2 line under control of the external file control unit (FCU) by means of gate 199. The end of all elements of an acceleration phase are due to the raising of the Seek 2 line as can be seen with reference to FIGS. 14a to 14d, and 15a to 15d.

Thus, it is clear that a positive output is supplied from the compare circuit 81 on line 79 whenever the actual velocity $V_a$ exceeds the stored velocity $V_s$ of the transducer 7. The line 79 is connected as one input to the AND gate 254, and the oscillator clock signal on terminal 84 is passed by AND gate 254 when the signal on line 70 indicates that an accelerate phase has commenced and the signal on line 79 indicates that the stored velocity $V_s$ is less than the actual velocity $V_a$. The oscillator signal thus gated by the AND circuit 254 increments the six bit binary counter 250 to increase the analog output from the D-A converter 252 and to thus increase the value $V_s$ of the stored velocity of transducer 70. The effect therefore is for the stored velocity $V_2$ to follow the value of the actual velocity $V_a$. Consequently, at the end of the accelerate phase when the signal on line 70 disappears and the clock signal is no longer gated to the counter 250, the value stored in the velocity store 78 is substantially equal to the actual velocity of the transducer 7 attained at the end of the accelerate phase.

Constant Velocity Phase

The constant or uniform velocity phase is commenced at the end of the accelerate phase in response to an up level of the Seek 2 signal arriving, with the Seek 1 signal remaining up. The accelerate phase has been terminated with the stored velocity in store 78 being equal to the velocity attained by the arm 18 (from hybrid velocity circuit 185) during the accelerate phase. Since the positive gate input to circuit 78 on line 70 has terminated, the velocity store 78 continues to provide an output signal representative of the stored velocity Vs to input 80 of the comparator 81. The presence of a Seek 2 signal also sets VFL latch 200 resulting in a gate signal on line 87 connected to condition AND gates 85, 86.

The arm 18 is now controlled to move at the uniform velocity attained during the acceleration phase for the rest of the uniform velocity phase. Thus, the output from the comparator 81 will be a down level when the actual velocity of the arm 18 falls below the velocity stored in store 78. The down level is inverted by inverter 88 to be supplied as a positive input to AND gate 85 functioning as a "too slow" logic gate. This positive signal is gated through AND gate 85 by the signal on line 87 and is passed by OR gate 71 and gating circuit 75 to turn on the appropriate coil driver in circuit 26, causing the arm 18 to be accelerated by energization of the appropriate half of the coil 20.

Should the velocity of the arm 18 exceed the stored velocity in store 78, an up level appears on line 79 from comparator 81 which is gated through AND gate 86 functioning as a "too fast" logic gate and gating circuit 75 to turn on the opposite coil driver in circuit 26 in such a manner as to slow the arm 18 until the actual instantaneous velocity of the arm 18 again equals the velocity stored in store 78. This process is continuous throughout the entire constant velocity phase, with the coil drivers 53 and 54 of driver circuit 26 either accelerating or retarding the arm to maintain the actual instantaneous velocity equal or substantially equal to the velocity stored in store 78. It will be noted that circuit 75 will allow only one coil driver to be energized at a given time due to the design of gate 75.

Retardation Phase

At the start of this phase, the Seek 1 pulse or signal is terminated, whereupon the input 89 of velocity store 78 causes the six bit counter register in store 78 to be reset to zero; and the output from store 78 falls to a capture velocity voltage Vc supplied by capture velocity circuit 90. Thus Vc is applied to input 80 of comparator 81 at this time. This voltage Vc from store 90 is a constant and corresponds to the capture velocity abovementioned. During this phase, the signal on line 87 remains up. The situation now is that the actual instantaneous velocity of arm 18 as represented by Va is much greater than the stored capture velocity voltage on line 80, and a positive signal appears on line 79. Arm 18 is then rapidly retarded by means of circuits 86, 75 and 26 until the two velocities are once again equal. The arm 18 is maintained at this capture velocity as during the previous constant velocity phase until the end of the retardation phase.

Track Following Phase

The Seek 2 signal drops one track before the arm 18 reaches the target track N, and the signal on line 87 supplied to AND gates 85, 86 is removed when the VFL 200 resets as the linear portion of the position error signal Ev for the target track is entered. The position error signal Ev which is connected to the compensator circuit 25 (see FIGS. 6 and 21) causes the driver 26 to revert to track following mode in the absence of signals on lines 57 and 58. The transducers 5, 6 and 7 are maintained in the track following mode until the next track access is made Although the example chosen and described above is a magnetic disk store, it will be appreciated by those skilled in the art that the same apparatus and method of accessing and track following is applicable to other storage devices, for example, magnetic drum stores.

I claim:

1. Data storage apparatus comprising a rotatable storage medium having a number of data tracks thereon, a data transducer moveable over the data tracks, an actuator for so moving the data transducer, means supplying signals to said actuator to cause the actuator to accelerate said transducer over a first predetermined distance, means supplying control signals to said actuator to move said transducer at a substantially uniform velocity over a second predetermined distance with the uniform velocity being equal or substantially equal to the velocity attained by said transducer as a result of the acceleration, means for retarding said transducer over the remaining distance until said transducer is over its destination track on said rotatable storage medium, means for determining the instantaneous velocity value of said data transducer as it moves, and means for storing a value representative of the velocity attained by said transducer as a result of the acceleration, said means supplying control signals to said actuator to move said transducer at a substantially uniform velocity including a compare circuit for comparing the instantaneous velocity value of said data transducer with said stored value and means connecting said compare circuit with said actuator so as to slow and hasten the movement of the actuator with different outputs of said compare circuit depending on the velocity corresponding to said stored value and the instantaneous velocity of the actuator, said means for supplying control signals to move said transducer at a substantially uniform velocity including a too slow logic gate and a too fast logic gate which respectively accelerate and retard said actuator and said transducer and each of which is connected with the output of said compare circuit so that, depending on whether the output of the compare circuit is up or down, the appropriate logic gate is energized to control the speed of the actuator and transducer and maintain the speed at said substantially uniform velocity.

2. Data storage apparatus as set forth in claim 1, said actuator for moving the data transducer including a coil carrying a current in order to provide movement of the data transducer, said means for determining the instantaneous velocity value of said data transducer including means for providing a position error signal which is proportional to the position of said transducer as said transducer crosses said tracks and means which is subject to said position error signal and subject to the current through said coil for producing said instantaneous velocity value dependent upon both said position error signal and the current flowing in said coil.

3. Data storage apparatus as set forth in claim 1, said rotatable storage medium also having a number of servo tracks thereon, a transducer carried by said actuator and moving across said servo tracks as said data transducer moves across said data tracks, said means for determining the instantaneous velocity value of said data transducer including means producing an error signal derived from said servo transducer which is proportional to the position of said servo transducer as the servo transducer crosses said servo tracks and means for providing a time derivative of the amplitude of said error signal, said actuator including a coil carrying a current therethrough for moving the actuator in accordance with coil current, means for producing a time integral of said coil current, and means for combining said time derivative and said time integral for producing said instantaneous velocity value which is a hybrid derived from said position error signal and the amount of current supplied to said coil.

4. Data storage apparatus as set forth in claim 1, said velocity values constituting voltages, means for providing a fixed voltage applied in parallel to said compare circuit along with said value representative of the velocity attained by said transducer as a result of the acceleration, and means for rendering said means for storing a value representative of the velocity attained by said transducer as applied to said compare circuit inoperative whereby said means applying said fixed voltage to said compare circuit may be operative to cause the actuator to move at a relatively low capture velocity subsequent to the movements of said actuator in said first and second predetermined distances.

5. Data storage apparatus comprising a rotatable storage medium having a number of data tracks thereon, a data transducer moveable over the data tracks, an actuator for moving the data transducer, means for determining the instantaneous velocity value of said data transducer as it moves, means for storing a value representative of a desired velocity of said transducer, means for controlling the velocity of said transducer including a compare circuit for comparing the instantaneous velocity value of said data transducer with said stored value, and means connecting said compare circuit with said actuator so as to slow and hasten the movement of the transducer with different outputs of the compare circuit depending on the velocity corresponding to said stored value and the instantaneous velocity value of the transducer and including a too slow logic gate and a too fast logic gate which respectively accelerate and retard said actuator and said transducer and each of which is connected with the output of said compare circuit so that depending on whether the output of the compare circuit is up or down the appropriate logic gate is energized to control the speed of the actuator and transducer, said actuator for moving the data transducer including a coil carrying a current in order to provide movement of the data transducer, said means for determining the instantaneous velocity value of said data transducer including means for providing a position error signal which is proportional to the position of said transducer as said transducer crosses said tracks and means which is subject to said position error signal and is subject to the current through said coil for producing said instantaneous velocity value depending upon both said position error signal and the current flowing in said coil.

6. Data storage apparatus as set forth in claim 5, said means for determining the instantaneous velocity value of said data transducer also including means for providing a time derivative of the amplitude of said error signal and means for producing a time integral of said coil current, said means for determining said instantaneous velocity value including means for combining said time derivative and said time integral so that said instantaneous velocity value is a hybrid derived from said position error signal and the amount of current supplied to said coil.

7. Data storage apparatus as set forth, in claim 6, said velocity values constituting voltages, means for providing a relatively low voltage applied in parallel to said compare circuit along with a relatively high voltage corresponding to said stored velocity value and being applied to the compare circuit along with the voltage corresponding to said stored velocity value, and means for rendering said means for storing a velocity value inoperative whereby said means applying said relatively low voltage to said compare circuit may be operative to cause the actuator to move at a relatively low velocity when said means for storing said velocity value is inoperative.

* * * * *